US011803008B2

(12) United States Patent
Jou et al.

(10) Patent No.: US 11,803,008 B2
(45) Date of Patent: Oct. 31, 2023

(54) OPTICAL DEVICE AND METHOD OF MANUFACTURING THE SAME

(71) Applicant: TAIWAN SEMICONDUCTOR MANUFACTURING COMPANY LTD., Hsinchu (TW)

(72) Inventors: Chewn-Pu Jou, Hsinchu (TW); Huan-Neng Chen, Taichung (TW); Lan-Chou Cho, Hsinchu (TW); Feng Wei Kuo, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 225 days.

(21) Appl. No.: 17/195,268

(22) Filed: Mar. 8, 2021

(65) Prior Publication Data

US 2021/0191039 A1 Jun. 24, 2021

Related U.S. Application Data

(62) Division of application No. 16/238,969, filed on Jan. 3, 2019, now Pat. No. 10,976,489.

(60) Provisional application No. 62/698,587, filed on Jul. 16, 2018.

(51) Int. Cl.
*G02B 6/12* (2006.01)
*G02B 6/122* (2006.01)

(52) U.S. Cl.
CPC ....... *G02B 6/12004* (2013.01); *G02B 6/1228* (2013.01); *G02B 2006/12061* (2013.01)

(58) Field of Classification Search
CPC ...... G02B 2006/12061; G02B 6/12004; G02B 6/1228
See application file for complete search history.

(56) References Cited

U.S. PATENT DOCUMENTS

| | | | |
|---|---|---|---|
| 7,805,037 B1 * | 9/2010 | Van Der Vliet ... | G02B 6/12007 385/129 |
| 11,061,234 B1 * | 7/2021 | Zhu ........................ | G01S 17/10 |
| 2007/0280605 A1 * | 12/2007 | Mendoza ........... | G02B 6/12007 385/92 |
| 2011/0135314 A1 * | 6/2011 | Tolstikhin ............. | H01S 5/0262 398/149 |
| 2012/0093456 A1 * | 4/2012 | Taillaert ................. | G02B 6/305 438/31 |
| 2012/0226118 A1 * | 9/2012 | Delbeke ............... | A61B 5/0031 600/316 |
| 2014/0044391 A1 * | 2/2014 | Iizuka ................... | H01L 31/173 438/24 |
| 2014/0111793 A1 * | 4/2014 | Asghari ................ | G01J 1/0425 356/73 |
| 2014/0133864 A1 * | 5/2014 | Asghari ................ | G02B 6/423 398/141 |

(Continued)

*Primary Examiner* — Thomas A Hollweg
*Assistant Examiner* — Mary A El-Shammaa
(74) *Attorney, Agent, or Firm* — WPAT LAW; Anthony King

(57) ABSTRACT

An optical device includes a waveguide configured to guide light, a taper integrated with the waveguide on a substrate configured for optical coupling, and an attenuator to degrade unwanted optical signal from the taper. The attenuator extends along one side of the taper, and includes one of a conductive structure, a doped structure and a refractive structure.

20 Claims, 23 Drawing Sheets

(56) References Cited

U.S. PATENT DOCUMENTS

| | | | |
|---|---|---|---|
| 2015/0117817 A1* | 4/2015 | Chen | G02B 6/305 |
| | | | 359/569 |
| 2015/0253472 A1* | 9/2015 | Kumar | G02B 6/122 |
| | | | 385/14 |
| 2015/0372453 A1* | 12/2015 | Yamazaki | G02F 2/00 |
| | | | 359/344 |
| 2017/0017036 A1* | 1/2017 | Botheroyd | H01S 3/094053 |
| 2017/0045686 A1* | 2/2017 | Lee | G02B 6/1228 |
| 2017/0059779 A1* | 3/2017 | Okayama | G02B 6/1228 |
| 2017/0090118 A1* | 3/2017 | Sodagar | G02B 6/14 |
| 2017/0192171 A1* | 7/2017 | Shi | G02B 6/1228 |
| 2018/0081207 A1* | 3/2018 | Qian | G02B 6/30 |

* cited by examiner

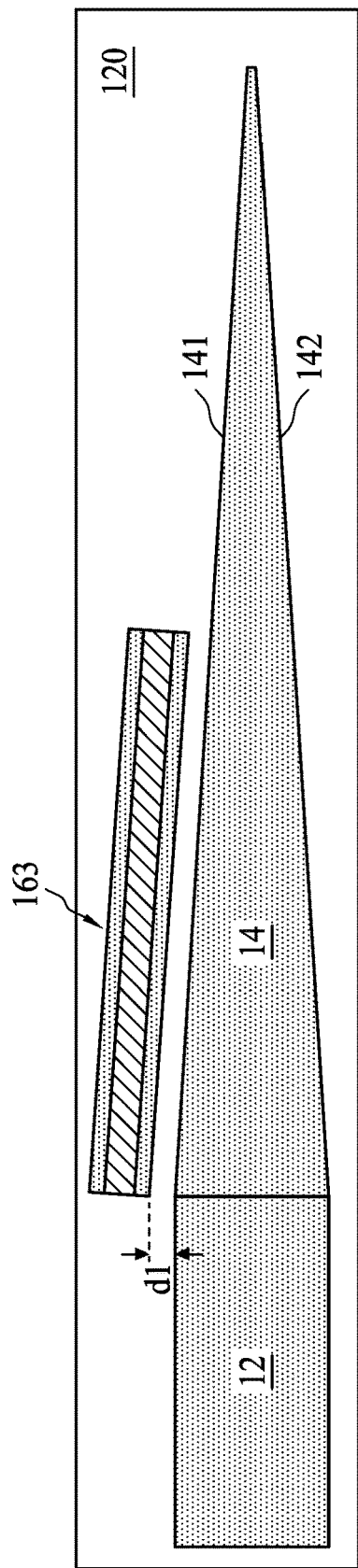
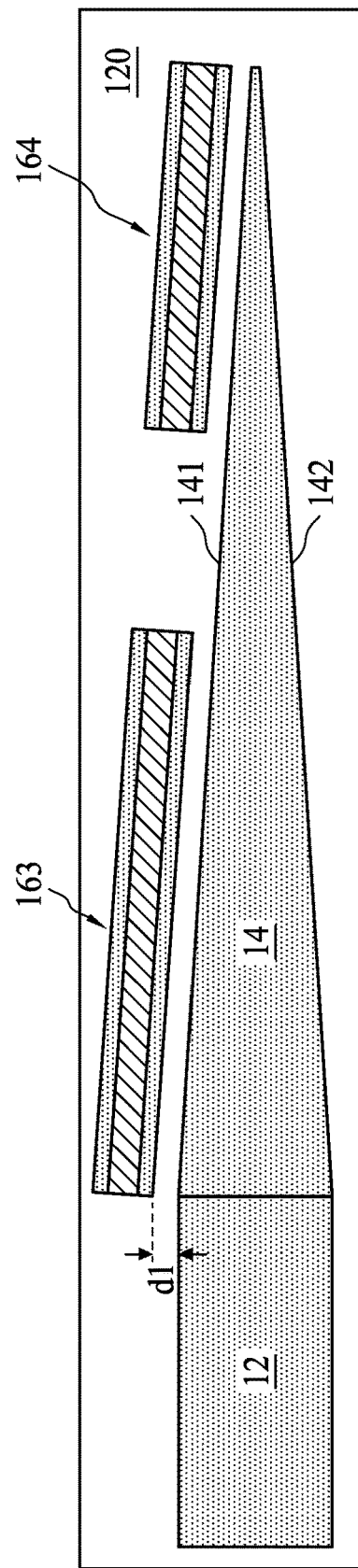
FIG. 1D
FIG. 1E

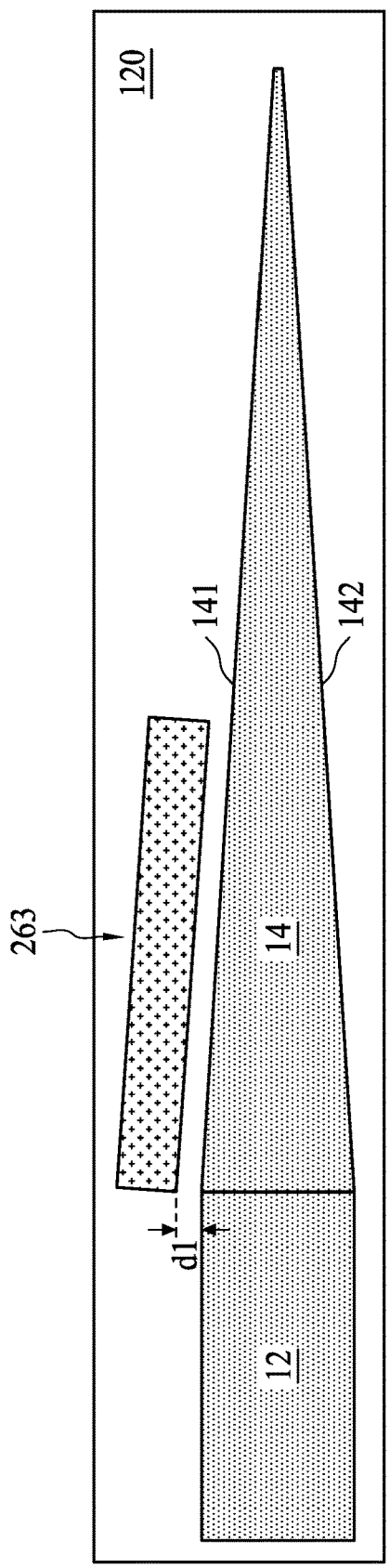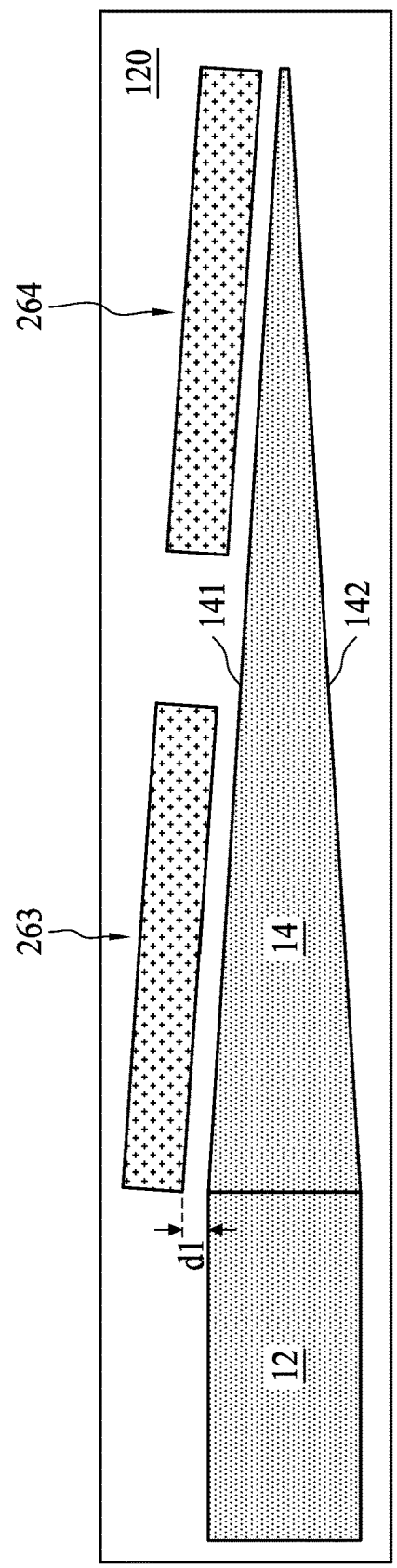
FIG. 2D
FIG. 2E

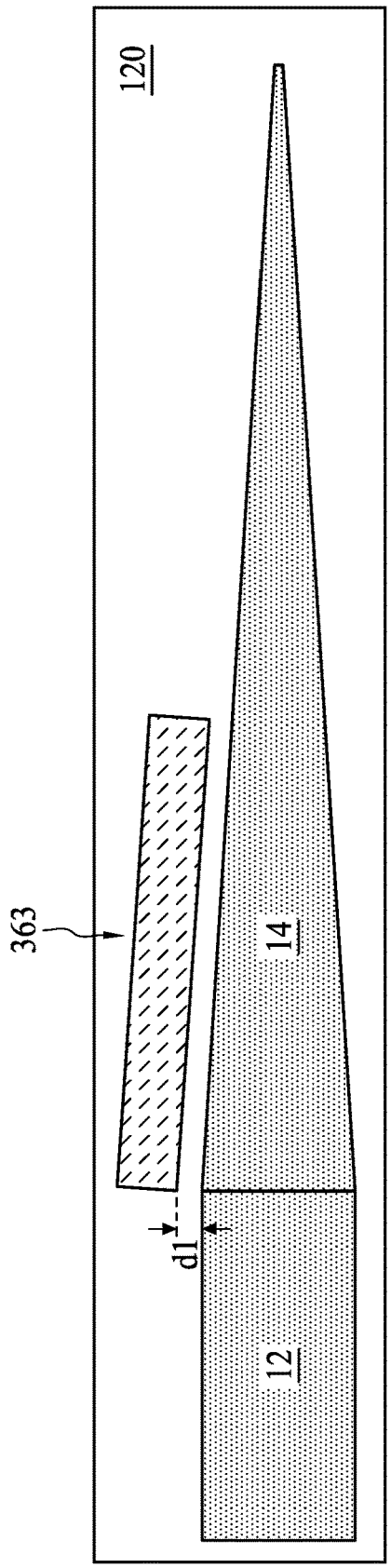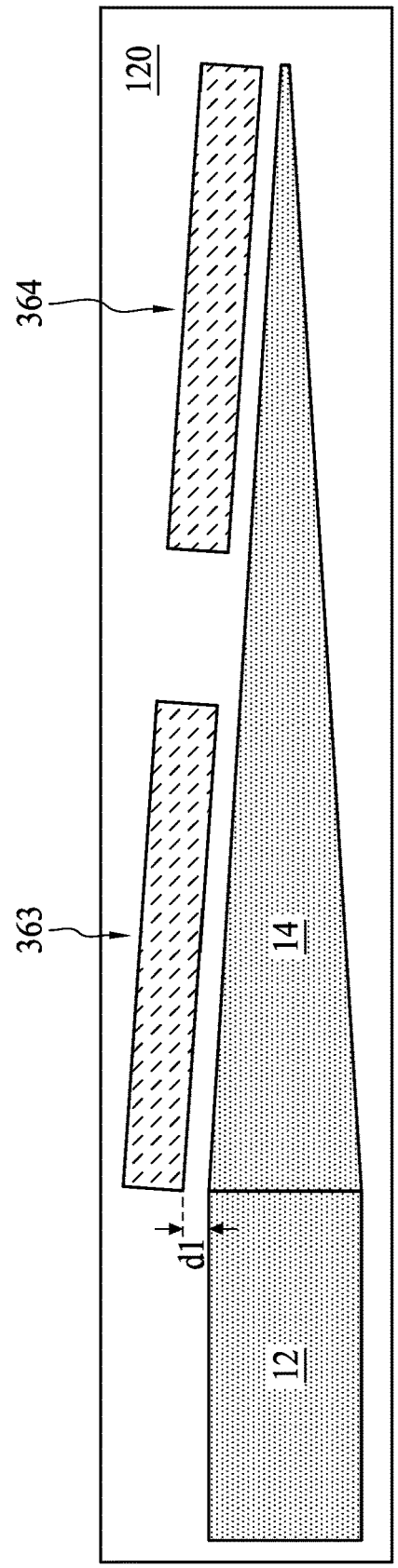

OPTICAL DEVICE AND METHOD OF MANUFACTURING THE SAME

CROSS-REFERENCE TO RELATED APPLICATION

This application claims the benefit of U.S. Provisional Application No. 62/698,587 filed on Jul. 16, 2018 and U.S. Non-Provisional application Ser. No. 16/238,969 filed on Jan. 3, 2019, which is incorporated by reference in its entirety.

BACKGROUND

The present disclosure relates to an optical device and, more particularly, to an optical device including a waveguide, a taper and an attenuator, and a method of forming the optical device.

Optical waveguides are often used as components in optical circuits having multiple photonic functions. A waveguide is used to confine and guide light from a first point on an integrated chip (IC) to a second point on the IC. In addition, a taper is used to facilitate a high coupling efficiency between the waveguide and another optical device. Unwanted optical signal may be radiated from the taper and cause interference with other optical devices. An attenuator may be used to degrade unwanted optical signal from a taper.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1D is a schematic diagram of an optical device, in accordance with yet another embodiment of the present disclosure.

FIG. 1E is a schematic diagram of an optical device, in accordance with still another embodiment of the present disclosure.

FIG. 2D is a schematic diagram of an optical device, in accordance with yet another embodiment of the present disclosure.

FIG. 2E is a schematic diagram of an optical device, in accordance with still another embodiment of the present disclosure.

FIG. 4D is a schematic diagram of an optical device, in accordance with yet another embodiment of the present disclosure.

FIG. 4E is a schematic diagram of an optical device, in accordance with still another embodiment of the present disclosure.

DETAILED DESCRIPTION

Figure 1A:
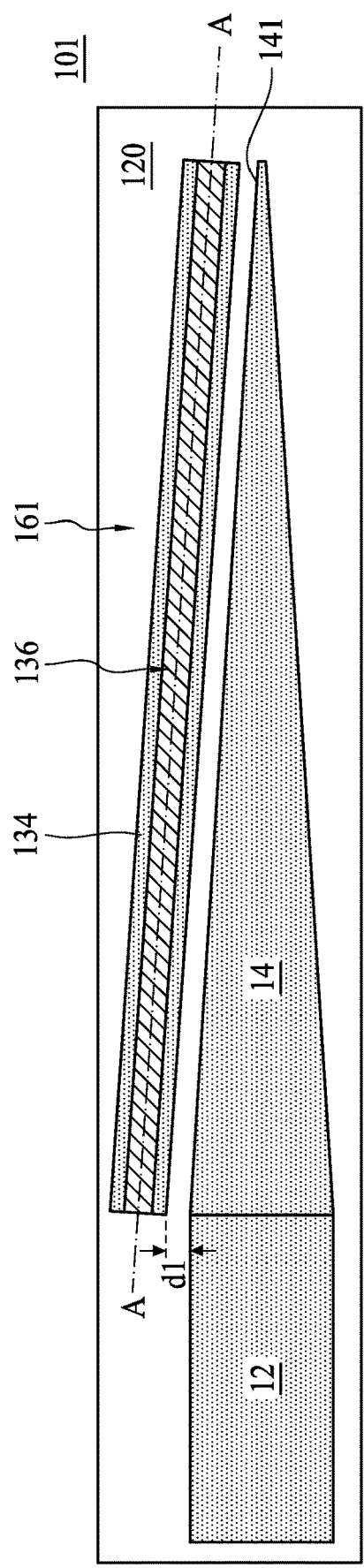
FIG. 1A is a schematic diagram of an optical device, in accordance with an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure provides an optical device including an attenuator to degrade unwanted optical signal transmitted between optical ports or interfaces. With the attenuator, isolation between optical ports may be enhanced and interference can be reduced. The attenuator may include one of a conductive structure, a doped structure and a refractive structure. These structures are all available in fabrication processes.

FIG. 1A is a schematic diagram of an optical device 101, in accordance with an embodiment of the present disclosure.

Referring to FIG. 1A, the optical device 101 includes a waveguide 12, a taper 14 and an attenuator 161. In an embodiment, the optical device 101 may include a directional coupler, which may serve as a power combiner, a power divider, an add-drop multiplexer or a switch. The waveguide 12 is used to confine and guide light. The taper 14, which is integrated with the waveguide 12, is used to couple the waveguide 12 to, for example, another waveguide. The taper 14 during operation may radiate unwanted optical signal, for example, signal reflected from other optical devices. However, unwanted signal radiated from the taper 14 may cause interference with other optical devices such as optical splitters or optical modulators. The attenuator 16 functions to degrade unwanted optical signal from the taper 14 in order to alleviate the impact. The waveguide 12, taper 14 and attenuator 161 may be formed on a substrate 134, for example, a semiconductor-on-insulator (SOI). An SOI substrate includes a layered silicon-insulator-silicon, which helps reduce parasitic device capacitance, thereby improving performance. In addition, the waveguide 12, taper 14 and attenuator 161 are disposed in a dielectric layer 120, for example, an oxide layer on the substrate 134.

The attenuator 161 includes a conductive structure 136, which will be discussed in detail by reference to FIG. 1B. Moreover, the attenuator 161 extends along a first side 141 of the taper 14, and is spaced apart from the taper 14 by a first gap d1. In an embodiment, the first gap d1 ranges from approximately 100 to 2,000 nanometers (nm). In another embodiment, the first gap d1 is approximately 150 nm. The relatively small gap d1 and the conductive structure 136 facilitate degradation or attenuation of unwanted signal radiated from the taper 14.

Figure 1B:
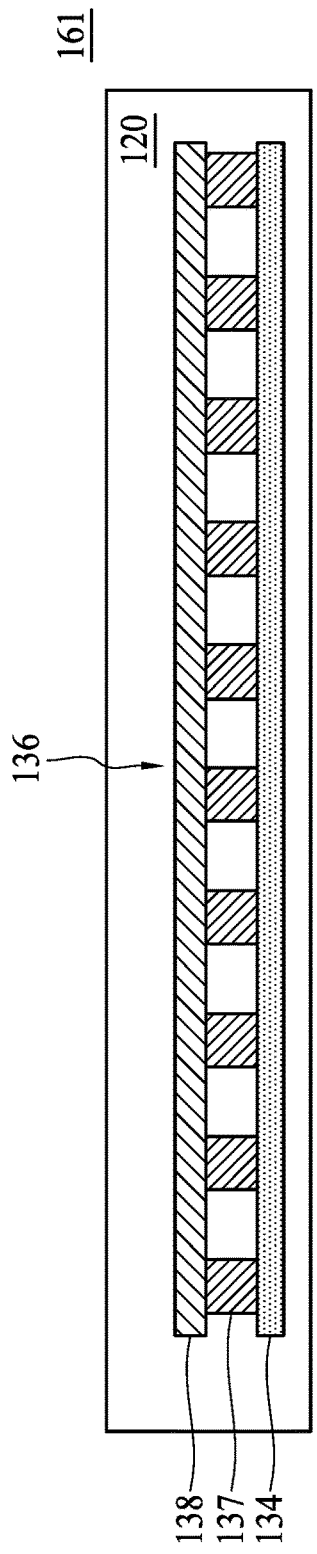
FIG. 1B is a cross-sectional view of an attenuator of the optical device illustrated in FIG. 1A, taken along a line AA, in accordance with an embodiment of the present disclosure.

FIG. 1B is a cross-sectional view of the attenuator 161 of the optical device 101 illustrated in FIG. 1A, taken along a line AA, in accordance with an embodiment of the present disclosure.

Referring to FIG. 1B, the attenuator 161 includes conductive vias 137 on the substrate 134, and a metal layer 138 disposed on the conductive vias 137 and extending along the first side 141 of the taper 14. In an embodiment, copper is a suitable material for the conductive vias 137 and the metal layer 138.

Figure 1C:
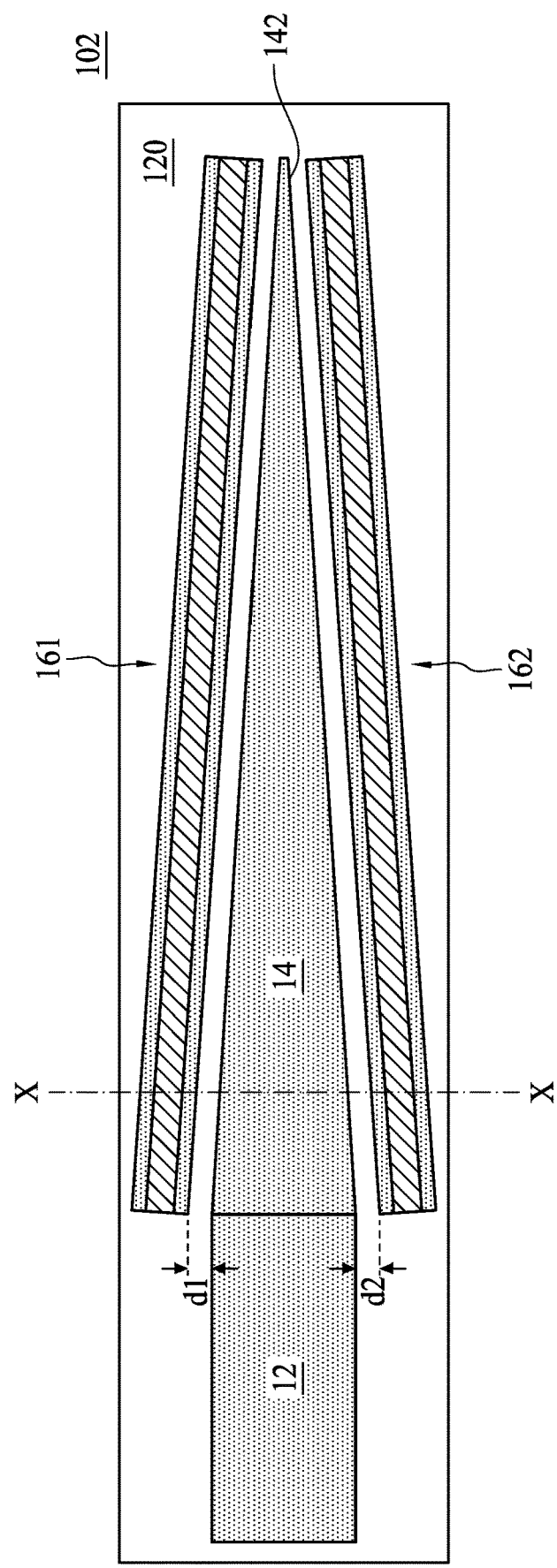
FIG. 1C is a schematic diagram of an optical device, in accordance with another embodiment of the present disclosure.

FIG. 1C is a schematic diagram of an optical device 102, in accordance with another embodiment of the present disclosure.

Referring to FIG. 1C, the optical device 102 is similar to the optical device 101 described and illustrated with reference to FIG. 1A except that, for example, the optical device 102 includes a second attenuator 162 in additional to a first attenuator 161. The second attenuator 162 extends along a second side 142, opposite to the first side 141, of the taper 14. Moreover, the second attenuator 162 includes a conductive structure similar to that of the first attenuator 16. Furthermore, the second attenuator 162 is spaced apart from the taper 14 by a second gap d2. In an embodiment, the second gap d2 ranges from approximately 100 to 2,000 nanometers (nm). In another embodiment, the second gap d2 is approximately 150 nm.

FIG. 1D is a schematic diagram of an optical device 103, in accordance with yet another embodiment of the present disclosure.

Referring to FIG. 1D, the optical device 103 is similar to the optical device 101 described and illustrated with reference to FIG. 1A except, for example, an attenuator 163. In FIG. 1A, the attenuator 161 of the optical device 101 extends along substantially the full length of the first sides 141 of the taper 14. By comparison, the attenuator 163 of the optical device 103 extends along a portion of the first side 141 of the taper 14. Moreover, the attenuator 163 includes a conductive structure similar to that of the first attenuator 161.

In other embodiments, like the optical device 102 illustrated in FIG. 1C, the optical device 103 may further include a second attenuator (not shown) that extends along the second side 142 of the taper 14. The second attenuator of the optical device 103 may extend along a full length or a portion of the second side 142, and includes a conductive structure similar to that of the first attenuator 161.

FIG. 1E is a schematic diagram of an optical device 104, in accordance with still another embodiment of the present disclosure.

Referring to FIG. 1E, the optical device 104 is similar to the optical device 103 described and illustrated with reference to FIG. 1D except that, for example, the optical device 104 includes a second attenuator 164 in additional to the first attenuator 163. The second attenuator 164 is separated from the first attenuator 163 and extends along another portion of the first side 142 of the taper 14, and includes a conductive structure similar to that of the first attenuator 161.

In other embodiments, like the optical device 102 illustrated in FIG. 1C, the optical device 104 may further include a third attenuator (not shown) that extends along the second side 142 of the taper 14. The third attenuator of the optical device 104 may extend along a full length or a portion of the second side 142, and includes a conductive structure similar to that of the first attenuator 163. In the case of a third attenuator extending along a portion of the second side 142, the optical device 104 may further include a fourth attenuator (not shown) that is separated from the third attenuator and extends along another portion of the second side 142 of the taper 14.

Figure 2A:
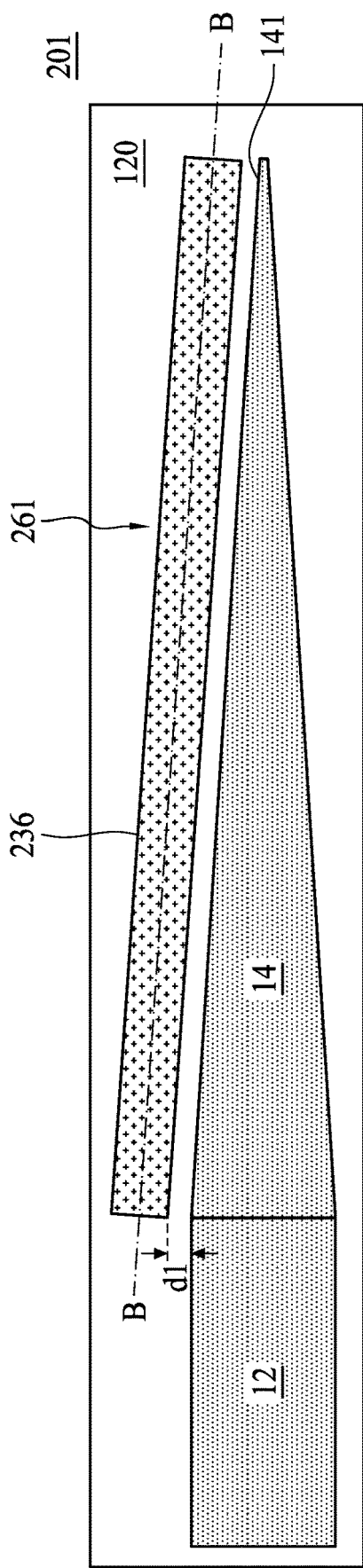
FIG. 2A is a schematic diagram of an optical device, in accordance with an embodiment of the present disclosure.

FIG. 2A is a schematic diagram of an optical device 201, in accordance with an embodiment of the present disclosure.

Referring to FIG. 2A, the optical device 201 is similar to the optical device 101 described and illustrated with reference to FIG. 1A except that, for example, an attenuator 261 replaces the attenuator 161. The attenuator 261 includes a doped structure 236, which will be discussed in detail by reference to FIG. 2B. Moreover, the attenuator 261 extends along a first side 141 of the taper 14, and is spaced apart from the taper 14 by the first gap d1.

Figure 2B:
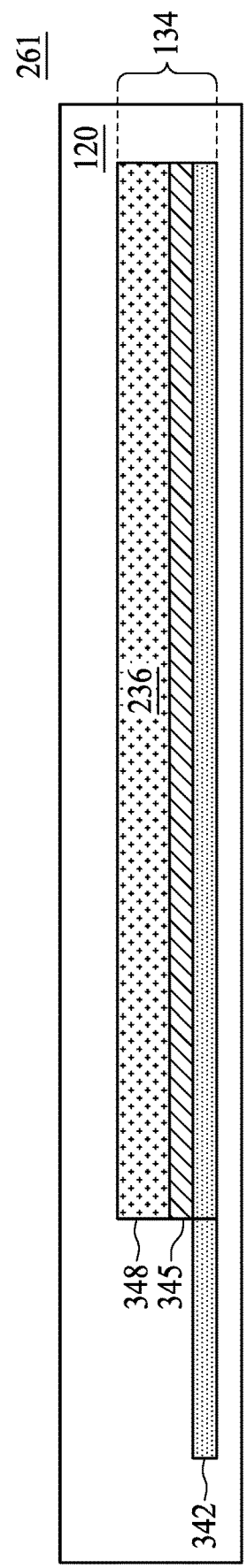
FIG. 2B is a cross-sectional view of an attenuator of the optical device illustrated in FIG. 2A, taken along a line BB, in accordance with an embodiment of the present disclosure.

FIG. 2B is a cross-sectional view of an attenuator of the optical device 201 illustrated in FIG. 2A, taken along a line BB, in accordance with an embodiment of the present disclosure.

Referring to FIG. 2B, the attenuator 261 may be formed on a substrate 134, for example, a semiconductor-on-insulator (SOI). The SOI substrate 134 includes a first silicon layer 342, a buried oxide layer (BOX) 345 on the first silicon layer 342, and a second silicon layer 348 on the BOX 345. In the present embodiment, the doped structure 236 is formed by doping the second silicon layer 348 with an n-type or a p-type impurity.

Figure 2C:
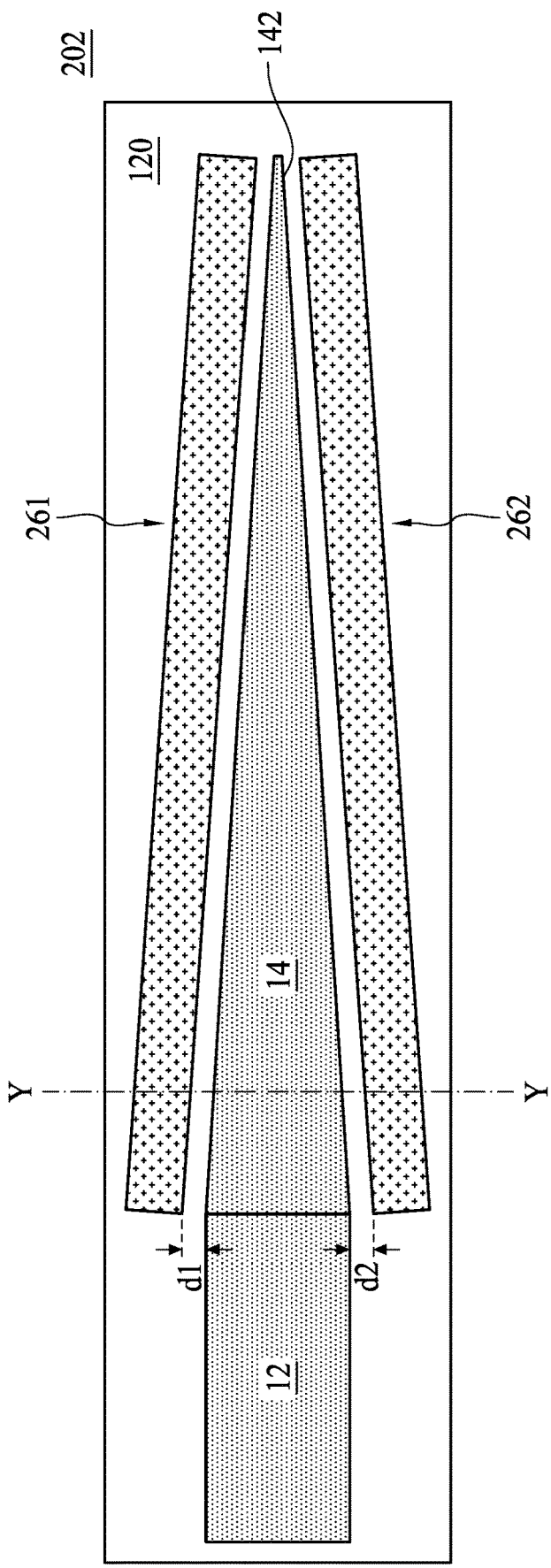
FIG. 2C is a schematic diagram of an optical device, in accordance with another embodiment of the present disclosure.

FIG. 2C is a schematic diagram of an optical device 202, in accordance with another embodiment of the present disclosure.

Referring to FIG. 2C, the optical device 202 is similar to the optical device 201 described and illustrated with reference to FIG. 2A except that, for example, the optical device 202 includes a second attenuator 262 in additional to a first attenuator 261. The second attenuator 262 extends along a second side 142, opposite to the first side 141, of the taper 14. Moreover, the second attenuator 262 includes a doped structure similar to that of the first attenuator 261. Furthermore, the second attenuator 262 is spaced apart from the taper 14 by the second gap d2.

FIG. 2D is a schematic diagram of an optical device 203 accordance with yet another embodiment of the present disclosure.

Referring to FIG. 2D, the optical device 203 is similar to the optical device 201 described and illustrated with reference to FIG. 2A except, for example, an attenuator 263. In FIG. 2A, the attenuator 261 of the optical device 201 extends along substantially the full length of the first sides 141 of the taper 14. By comparison, the attenuator 263 of the optical device 203 extends along a portion of the first side 141 of the taper 14. Moreover, the attenuator 263 includes a doped structure similar to that of the first attenuator 261.

In other embodiments, like the optical device 202 illustrated in FIG. 2C, the optical device 203 may further include a second attenuator (not shown) that extends along the second side 142 of the taper 14. The second attenuator of the optical device 203 may extend along a full length or a portion of the second side 142, and includes a doped structure similar to that of the first attenuator 161.

FIG. 2E is a schematic diagram of an optical device 204, in accordance with still another embodiment of the present disclosure.

Referring to FIG. 2E, the optical device 204 is similar to the optical device 203 described and illustrated with reference to FIG. 2D except that, for example, the optical device 204 includes a second attenuator 264 in additional to the first attenuator 263. The second attenuator 264 is separated from the first attenuator 263 and extends along another portion of the first side 142 of the taper 14, and includes a doped structure similar to that of the first attenuator 161.

In other embodiments, like the optical device 202 illustrated in FIG. 2C, the optical device 204 may further include a third attenuator (not shown) that extends along the second side 142 of the taper 14. The third attenuator of the optical device 204 may extend along a full length or a portion of the second side 142, and includes a doped structure similar to that of the first attenuator 261. In the case of a third attenuator extending along a portion of the second side 142, the optical device 204 may further include a fourth attenuator (not shown) that is separated from the third attenuator and extends along another portion of the second side 142 of the taper 14.

Figure 3A:
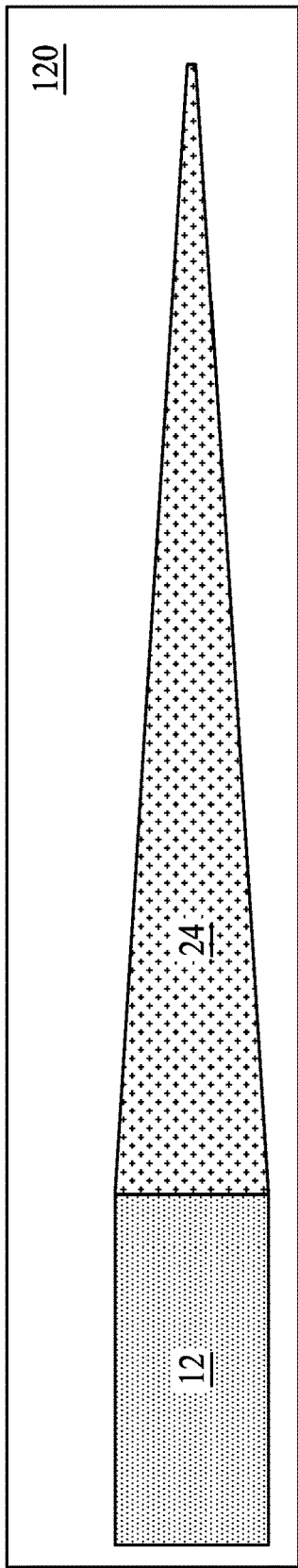
FIG. 3A is a schematic diagram of an optical device, in accordance with an embodiment of the present disclosure.

FIG. 3A is a schematic diagram of an optical device 301, in accordance with an embodiment of the present disclosure.

Referring to FIG. 3A, the optical device 301 includes a taper 24 that is doped with impurity (hereinafter the "doped taper"). The doped taper 24 facilitates alleviation of unwanted signal radiated therefrom. Since the doped taper 24 also functions as an attenuator, as a result, an attenuator disposed along the taper 24 may be eliminated. In the present embodiment, the taper 24 is wholly doped with impurity. In other embodiments, however, only a portion or portions of the taper 24 are doped.

Figure 3B:
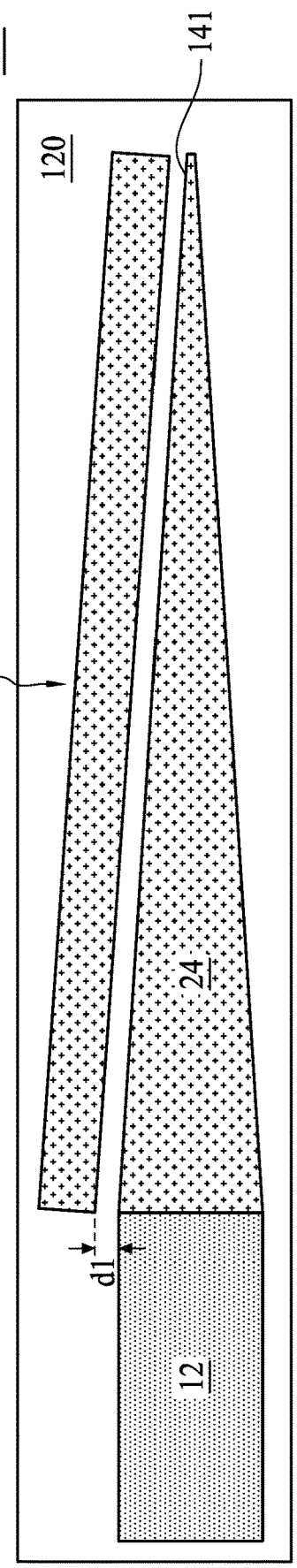
FIG. 3B is a schematic diagram of an optical device, in accordance with another embodiment of the present disclosure.

FIG. 3B is a schematic diagram of an optical device 302, in accordance with another embodiment of the present disclosure.

Referring to FIG. 3B, the optical device 302 is similar to the optical device 201 described and illustrated with reference to FIG. 2A except, for example, the doped taper 24. In addition to the doped first attenuator 261, the doped taper 24 also functions to degrade unwanted signal.

Figure 3C:
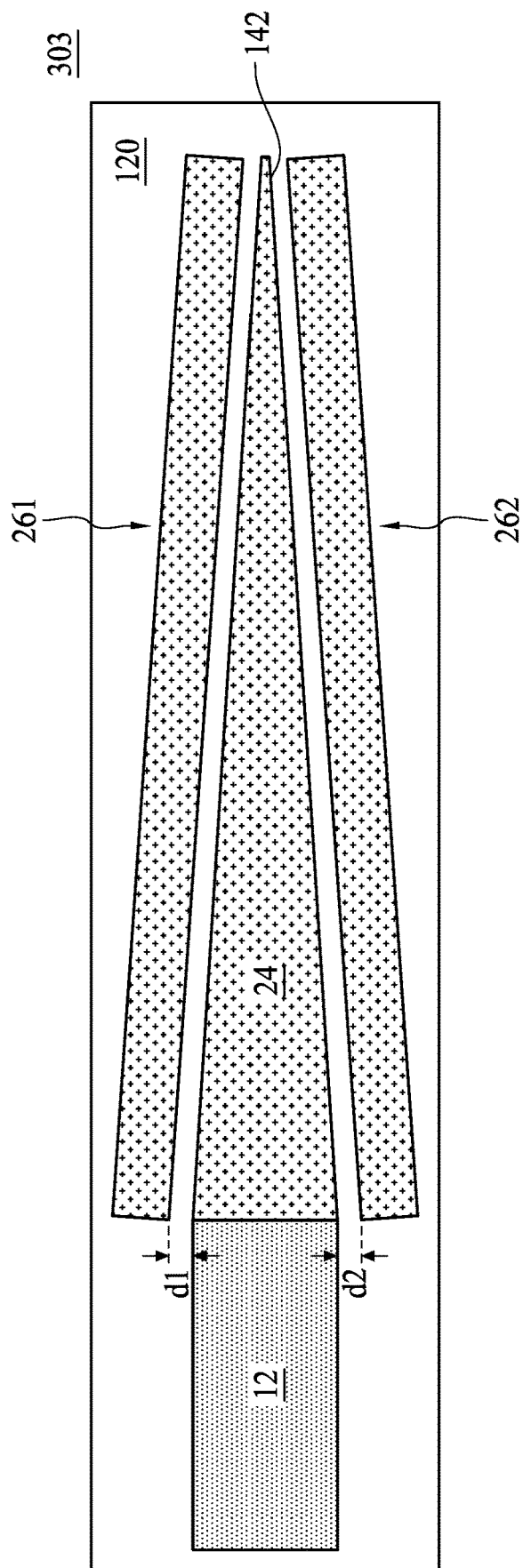
FIG. 3C is a schematic diagram of an optical device, in accordance with yet another embodiment of the present disclosure.

FIG. 3C is a schematic diagram of an optical device 303, in accordance with yet another embodiment of the present disclosure.

Referring to FIG. 3C, the optical device 303 is similar to the optical device 202 described and illustrated with reference to FIG. 2C except, for example, the doped taper 24. In addition to the doped first attenuator 261 and the doped second attenuator 262, the doped taper 24 also functions to degrade unwanted signal.

Figure 3D:
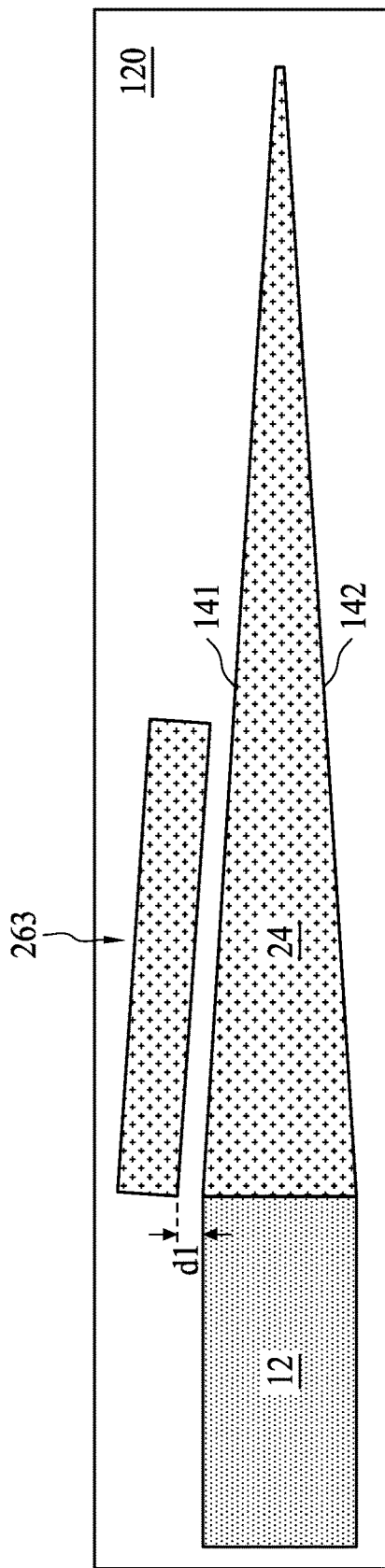
FIG. 3D is a schematic diagram of an optical device, in accordance with still another embodiment of the present disclosure.

FIG. 3D is a schematic diagram of an optical device 304, in accordance with still another embodiment of the present disclosure.

Referring to FIG. 3D, the optical device 304 is similar to the optical device 203 described and illustrated with reference to FIG. 2D except, for example, the doped taper 24. In addition to the doped first attenuator 263, the doped taper 24 also functions to degrade unwanted signal.

In other embodiments, like the optical device 303 illustrated in FIG. 3C, the optical device 304 may further include a second attenuator (not shown) that extends along the second side 142 of the taper 24. The second attenuator of the optical device 304 may extend along a full length or a portion of the second side 142, and includes a doped structure similar to that of the first attenuator 261.

Figure 3E:
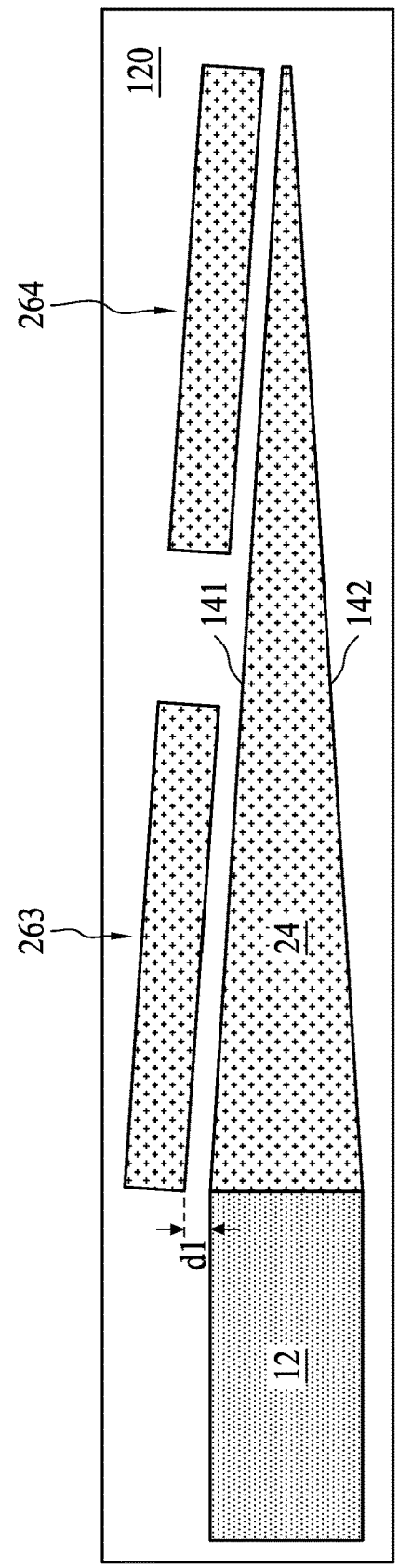
FIG. 3E is a schematic diagram of an optical device, in accordance with yet still another embodiment of the present disclosure.

FIG. 3E is a schematic diagram of an optical device 305, in accordance with yet still another embodiment of the present disclosure.

Referring to FIG. 3E, the optical device 305 is similar to the optical device 204 described and illustrated with reference to FIG. 2E except, for example, the doped taper 24. In addition to the doped first attenuator 263 and the doped second attenuator 264, the doped taper 24 also functions to degrade unwanted signal.

In other embodiments, like the optical device 303 illustrated in FIG. 3C, the optical device 305 may further include a third attenuator (not shown) that extends along the second side 142 of the taper 24. The third attenuator of the optical device 305 may extend along a full length or a portion of the second side 142, and includes a doped structure similar to that of the first attenuator 261. In the case of a third attenuator extending along a portion of the second side 142, the optical device 305 may further include a fourth attenuator (not shown) that is separated from the third attenuator and extends along another portion of the second side 142 of the taper 24.

Figure 4A:
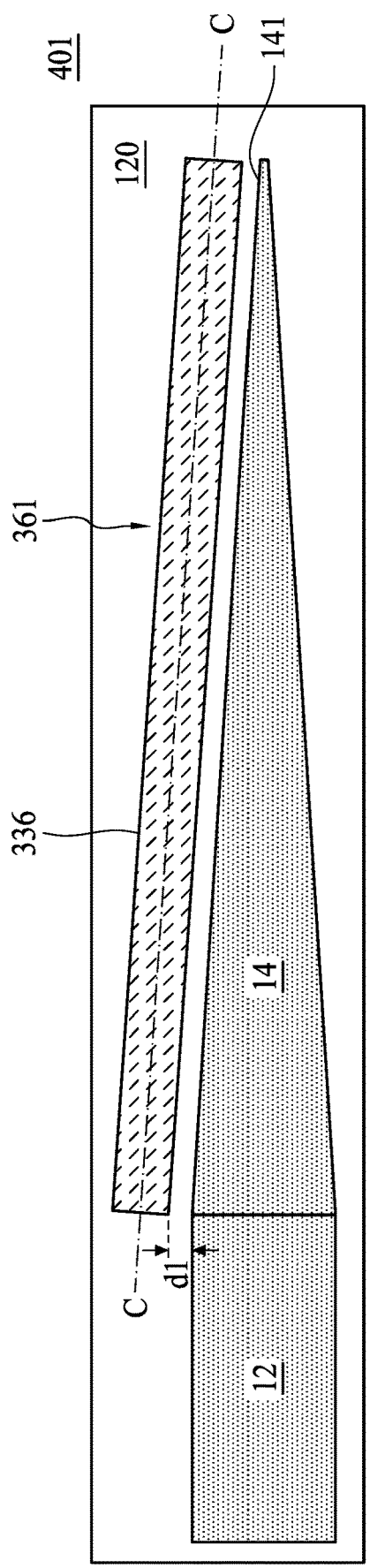
FIG. 4A is a schematic diagram of an optical device, in accordance with an embodiment of the present disclosure.

FIG. 4A is a schematic diagram of an optical device 401, in accordance with an embodiment of the present disclosure.

Referring to FIG. 4A, the optical device 401 is similar to the optical device 201 described and illustrated with reference to FIG. 2A except that, for example, an attenuator 361 replaces the attenuator 261. The attenuator 361 includes a refraction structure 336, which will be discussed in detail by reference to FIG. 4B. Moreover, the attenuator 361 extends along a first side 141 of the taper 14, and is spaced apart from the taper 14 by the first gap d1.

Figure 4B:
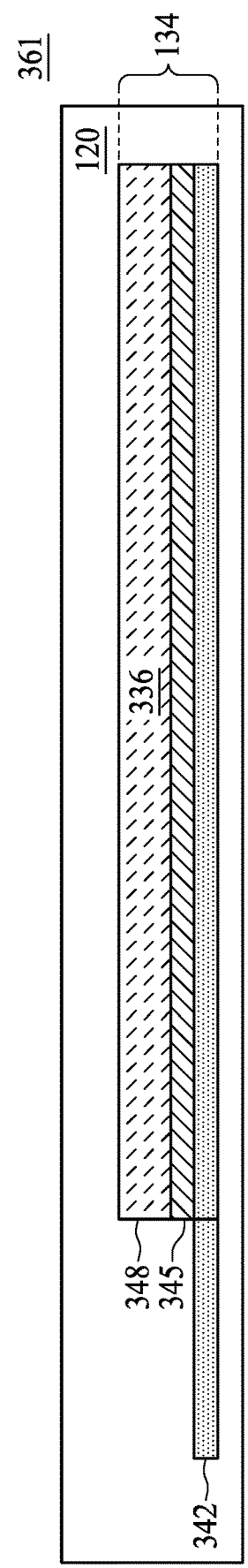
FIG. 4B is a cross-sectional view of an attenuator of the optical device illustrated in FIG. 4A, taken along a line CC, in accordance with an embodiment of the present disclosure.

FIG. 4B is a cross-sectional view of an attenuator of the optical device 401 illustrated in FIG. 4A, taken along a line CC, in accordance with an embodiment of the present disclosure.

Referring to FIG. 4B, the attenuator 361 may be formed on a substrate 134, for example, a semiconductor-on-insulator (SOI). The SOI substrate 134 includes a first silicon layer 342, a buried oxide layer (BOX) 345 on the first silicon layer 342, and a second silicon layer 348 on the BOX 345. In an embodiment, the refraction structure 336 may be formed by nitrogen implantation into the second silicon layer 342, resulting in a silicon nitride layer. Suitable materials, such as the exemplary silicon nitride, for the refraction structure 336 include those having an index of refraction larger than that of silicon, which in turn is larger than that of silicon oxide. As a result, the materials have an index larger than that of the substrate 134. With a larger index of refraction, the refraction structure 336 creates a total reflection environment and facilitates refracting away unwanted signal.

Figure 4C:
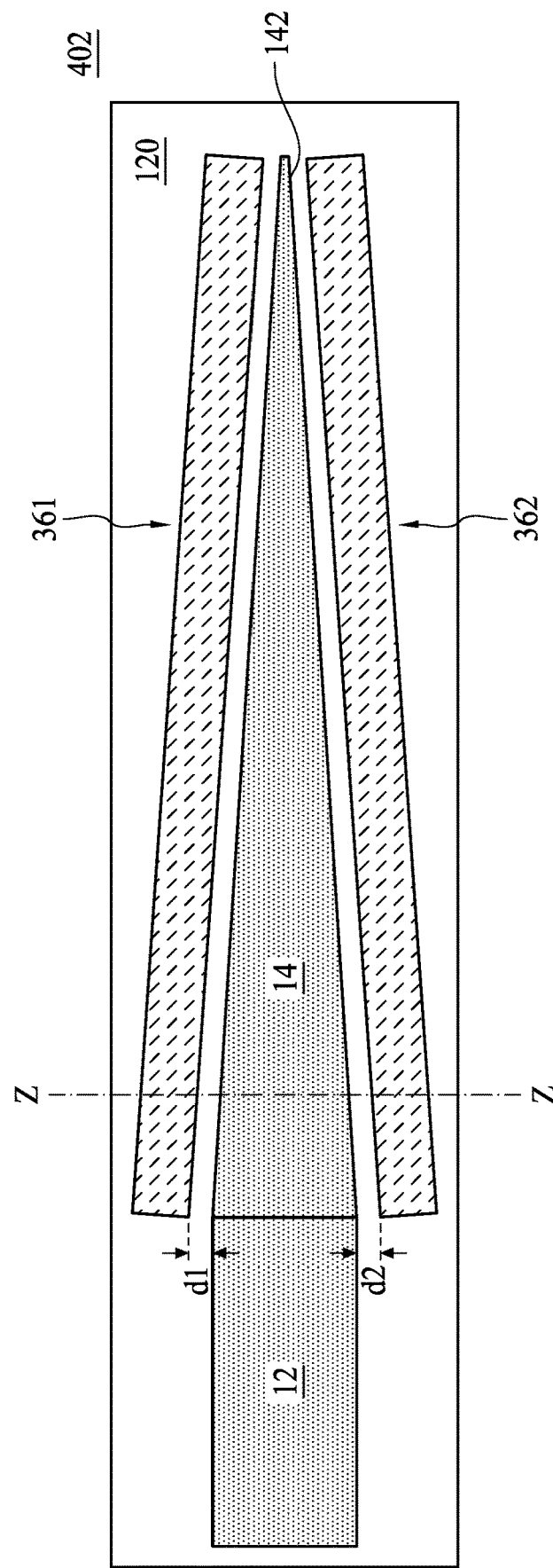
FIG. 4C is a schematic diagram of an optical device, in accordance with another embodiment of the present disclosure.

FIG. 4C is a schematic diagram of an optical device 402, in accordance with another embodiment of the present disclosure.

Referring to FIG. 4C, the optical device 402 is similar to the optical device 401 described and illustrated with reference to FIG. 4A except that, for example, the optical device 402 includes a second attenuator 362 in additional to a first attenuator 361. The second attenuator 362 extends along a second side 142, opposite to the first side 141, of the taper 14. Moreover, the second attenuator 362 includes a refraction structure similar to that of the first attenuator 361. Furthermore, the second attenuator 362 is spaced apart from the taper 14 by the second gap d2.

FIG. 4D is a schematic diagram of an optical device 403, in accordance with yet another embodiment of the present disclosure.

Referring to FIG. 4D, the optical device 403 is similar to the optical device 401 described and illustrated with reference to FIG. 4A except, for example, an attenuator 363. In FIG. 4A, the attenuator 361 of the optical device 401 extends along substantially the full length of the first sides 141 of the taper 14. By comparison, the attenuator 363 of the optical device 403 extends along a portion of the first side 141 of the taper 14. Moreover, the attenuator 363 includes a refraction structure similar to that of the first attenuator 361.

In other embodiments, like the optical device 402 illustrated in FIG. 4C, the optical device 403 may further include a second attenuator (not shown) that extends along the second side 142 of the taper 14. The second attenuator of the optical device 403 may extend along a full length or a portion of the second side 142, and includes a refraction structure similar to that of the first attenuator 361.

FIG. 4E is a schematic diagram of an optical device 404, in accordance with still another embodiment of the present disclosure.

Referring to FIG. 4E, the optical device 404 is similar to the optical device 403 described and illustrated with reference to FIG. 4D except that, for example, the optical device 404 includes a second attenuator 364 in additional to the first attenuator 363. The second attenuator 364 is separated from the first attenuator 363 and extends along another portion of the first side 142 of the taper 14, and includes a refraction structure similar to that of the first attenuator 361.

In other embodiments, like the optical device 402 illustrated in FIG. 4C, the optical device 404 may further include a third attenuator (not shown) that extends along the second side 142 of the taper 14. The third attenuator of the optical device 404 may extend along a full length or a portion of the second side 142, and includes a refraction structure similar to that of the first attenuator 361. In the case of a third attenuator extending along a portion of the second side 142, the optical device 404 may further include a fourth attenuator (not shown) that is separated from the third attenuator and extends along another portion of the second side 142 of the taper 14.

Figure 5A:
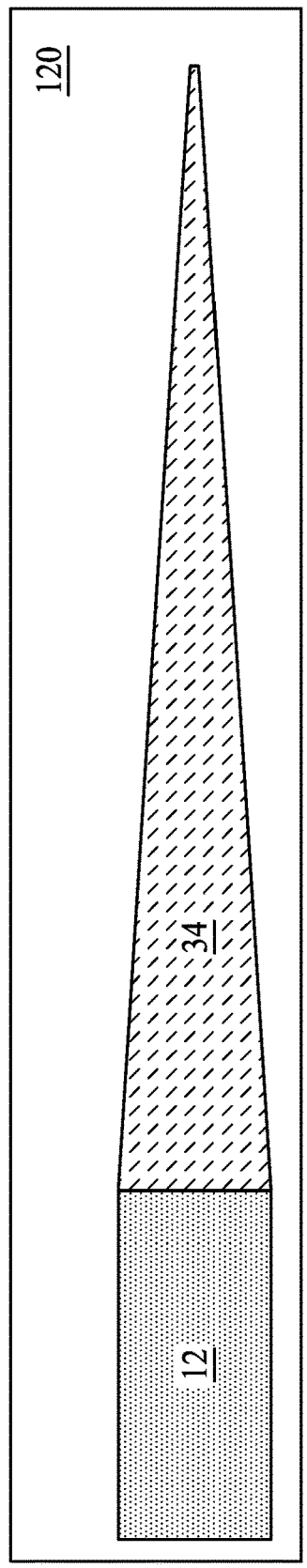
FIG. 5A is a schematic diagram of an optical device, in accordance with an embodiment of the present disclosure.

FIG. 5A is a schematic diagram of an optical device 501, in accordance with an embodiment of the present disclosure.

Referring to FIG. 5A, the optical device 501 includes a taper 34 having a refraction structure (hereinafter the "refractive taper"). The refractive taper 34 facilitates alleviation of unwanted signal radiated therefrom. Since the refractive taper 34 also functions as an attenuator, as a result, an attenuator disposed along the taper 34 may be eliminated. In the present embodiment, the taper 34 is wholly provided with a material having an index of refraction larger than that of the substrate. In other embodiments, however, only a portion or portions of the taper 34 are provided with the material.

Figure 5B:
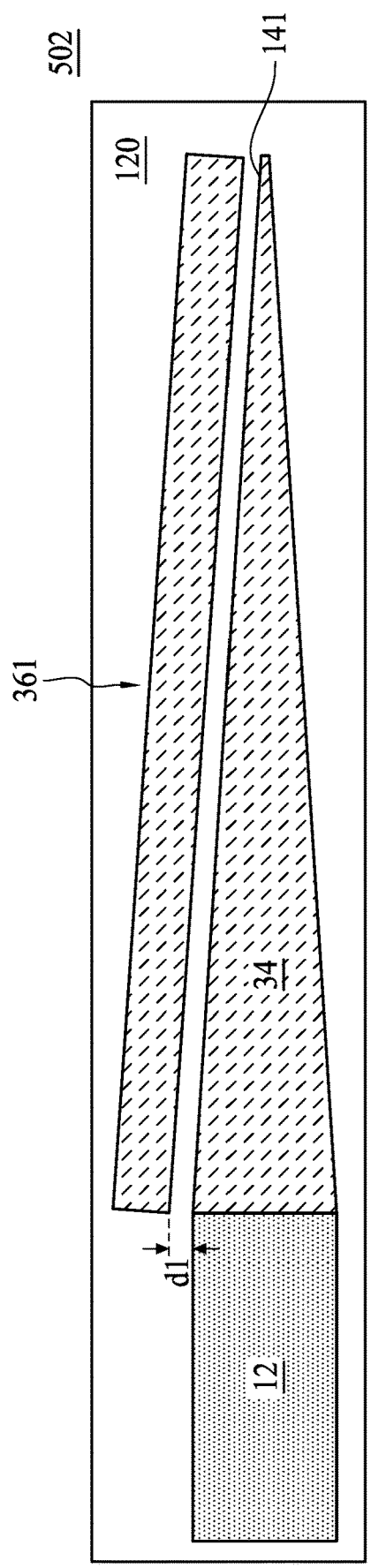
FIG. 5B is a schematic diagram of an optical device, in accordance with another embodiment of the present disclosure.

FIG. 5B is a schematic diagram of an optical device 502, in accordance with another embodiment of the present disclosure.

Referring to FIG. 5B, the optical device 502 is similar to the optical device 401 described and illustrated with reference to FIG. 4A except, for example, the refractive taper 34. In addition to the refractive first attenuator 361, the refractive taper 34 also functions to degrade unwanted signal.

Figure 5C:
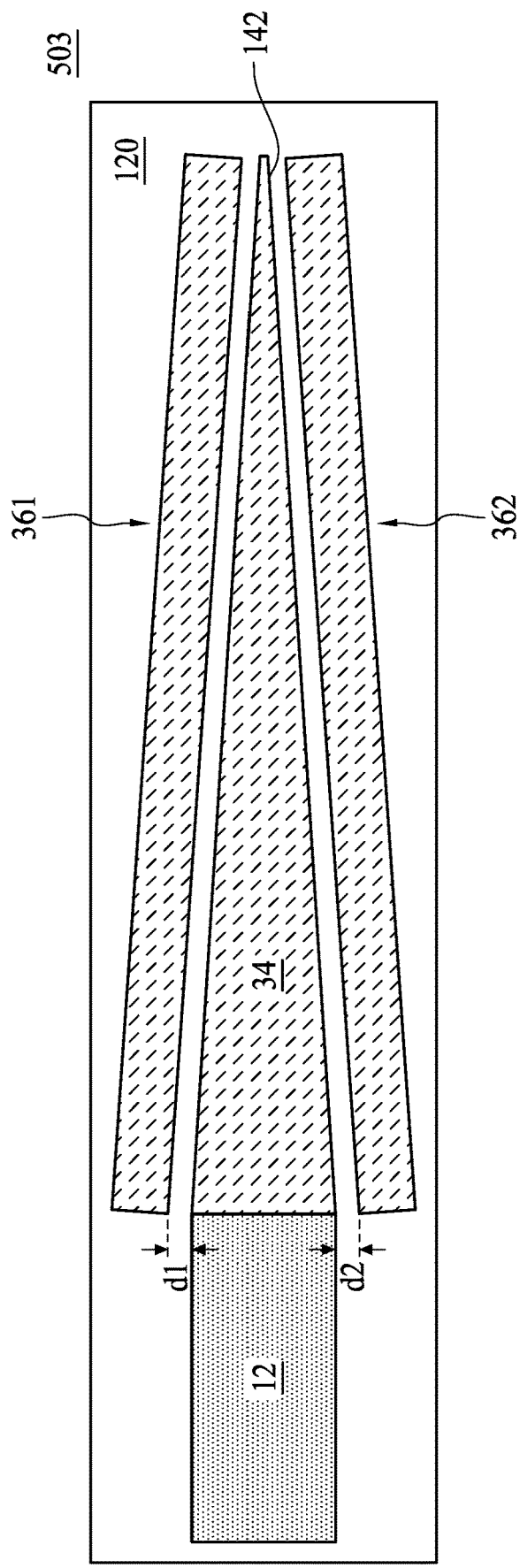
FIG. 5C is a schematic diagram of an optical device, in accordance with yet another embodiment of the present disclosure.

FIG. 5C is a schematic diagram of an optical device 503, in accordance with yet another embodiment of the present disclosure.

Referring to FIG. 5C, the optical device 503 is similar to the optical device 402 described and illustrated with reference to FIG. 4C except, for example, the refractive taper 34. In addition to the refractive first attenuator 361 and the refractive second attenuator 362, the refractive taper 34 also functions to degrade unwanted signal.

Figure 5D:
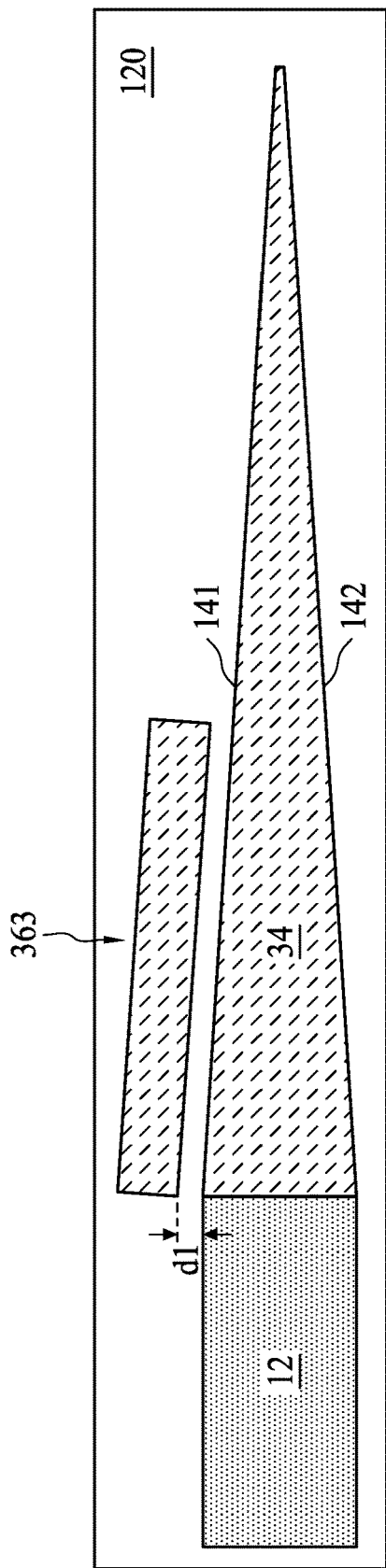
FIG. 5D is a schematic diagram of an optical device, in accordance with still another embodiment of the present disclosure.

FIG. 5D is a schematic diagram of an optical device 504, in accordance with still another embodiment of the present disclosure.

Referring to FIG. 5D, the optical device 504 is similar to the optical device 403 described and illustrated with reference to FIG. 4D except, for example, the refractive taper 34. In addition to the refractive first attenuator 363, the refractive taper 34 also functions to degrade unwanted signal.

In other embodiments, like the optical device 503 illustrated in FIG. 5C, the optical device 504 may further include a second attenuator (not shown) that extends along the second side 142 of the taper 34. The second attenuator of the optical device 504 may extend along a full length or a portion of the second side 142, and includes a refractive structure similar to that of the first attenuator 361.

Figure 5E:
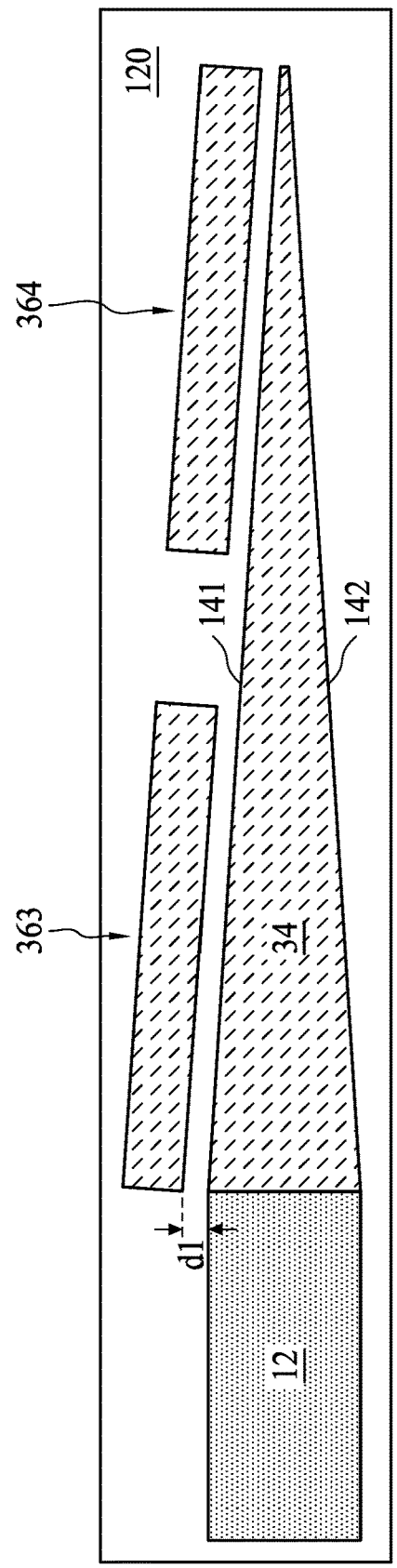
FIG. 5E is a schematic diagram of an optical device, in accordance with yet still another embodiment of the present disclosure.

FIG. 5E is a schematic diagram of an optical device 505, in accordance with yet still another embodiment of the present disclosure.

Referring to FIG. 5E, the optical device 505 is similar to the optical device 404 described and illustrated with reference to FIG. 4E except, for example, the refractive taper 34. In addition to the refractive first attenuator 363 and the refractive second attenuator 364, the refractive taper 34 also functions to degrade unwanted signal.

In other embodiments, like the optical device 503 illustrated in FIG. 5C, the optical device 505 may further include a third attenuator (not shown) that extends along the second side 142 of the taper 34. The third attenuator of the optical device 505 may extend along a full length or a portion of the second side 142, and includes a doped structure similar to that of the first attenuator 361. In the case of a third attenuator extending along a portion of the second side 142, the optical device 505 may further include a fourth attenuator (not shown) that is separated from the third attenuator and extends along another portion of the second side 142 of the taper 34.

FIGS. 6A to 6H are cross-sectional views showing a method of forming the optical device 102 illustrated in FIG. 1C, taken along a line XX, in accordance with some embodiments of the present disclosure.

Figure 6A:
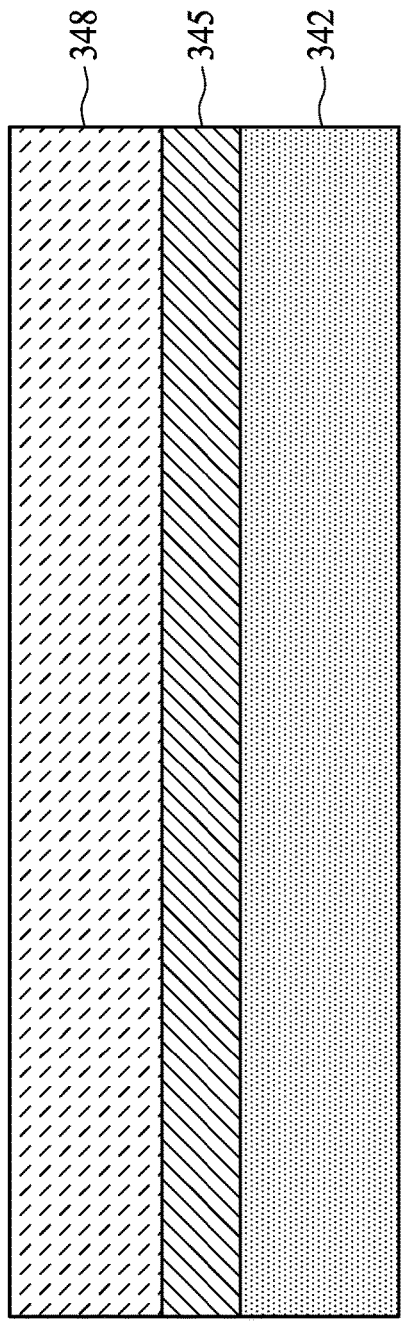
FIGS. 6A to 6H are cross-sectional views showing a method of forming the optical device illustrated in FIG. 1C, taken along a line XX, in accordance with some embodiments of the present disclosure.

Referring to FIG. 6A, a substrate 134, for example, an SOI substrate, is provided. The substrate 134 includes a first silicon layer 342, a second silicon layer 348, and a BOX layer 345 between the first silicon layer 342 and the second silicon layer 348.

Figure 6B:
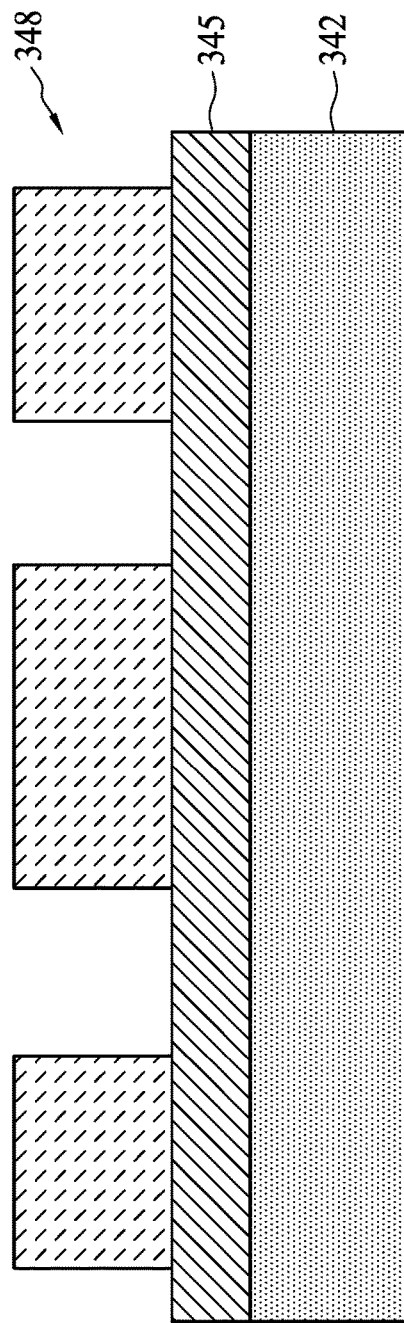

Referring to FIG. 6B, the second silicon layer 348 is patterned, exposing portions of the BOX layer 345.

Figure 6C:
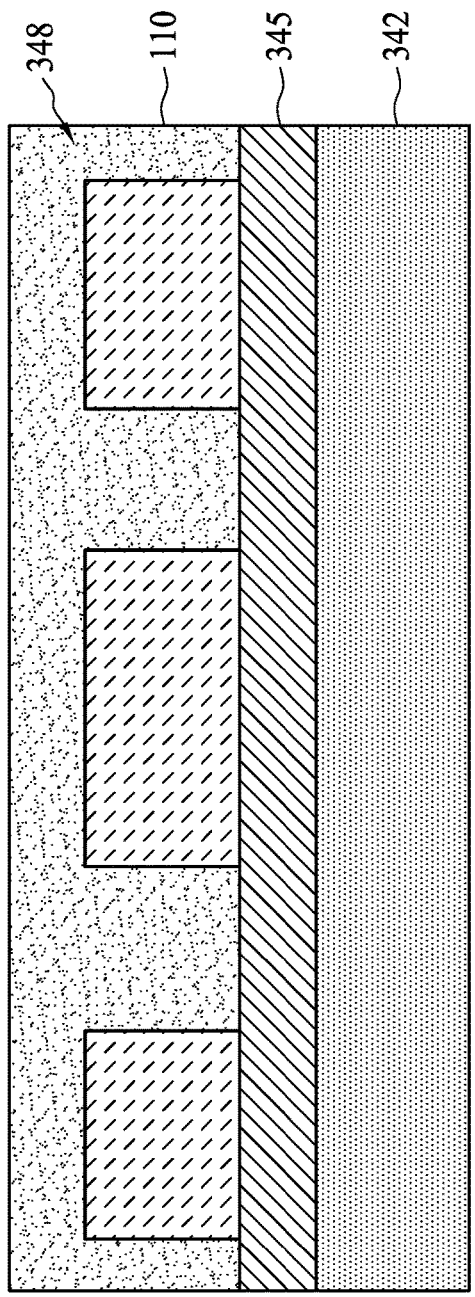
Figure 6D:
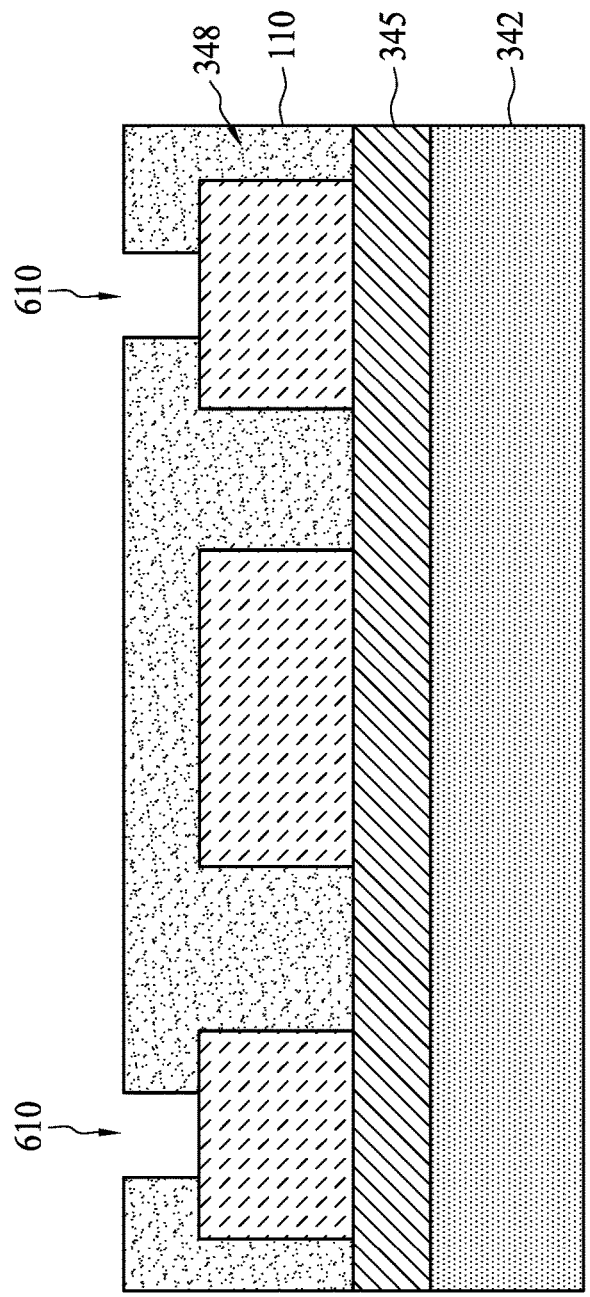

Next, referring to FIG. 6C, a dielectric layer 110 is formed on the BOX layer 345 and the patterned second silicon layer 348 by using, for example, a deposition process. Suitable materials for the dielectric layer 110 include silicon oxide. In FIG. 6D, openings 610 are then formed in an etching process to expose portions of the patterned second silicon layer 348. The openings 610 define locations where conductive vias to be subsequently formed.

Figure 6E:
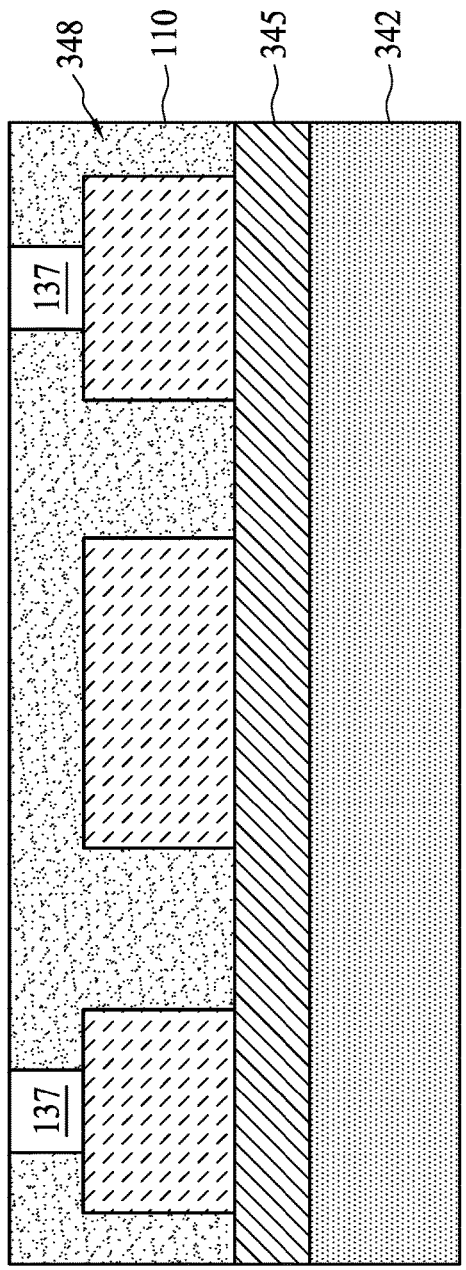

Referring to FIG. 6E, conductive vias 137 are formed on the patterned second silicon layer 348 by, for example, forming a conductive layer on the dielectric layer 110 in a plating process, filling the openings 610, followed by a chemical-mechanical polish (CMP) process. Suitable materials for the conductive vias 137 include, for example, copper.

Figure 6F:
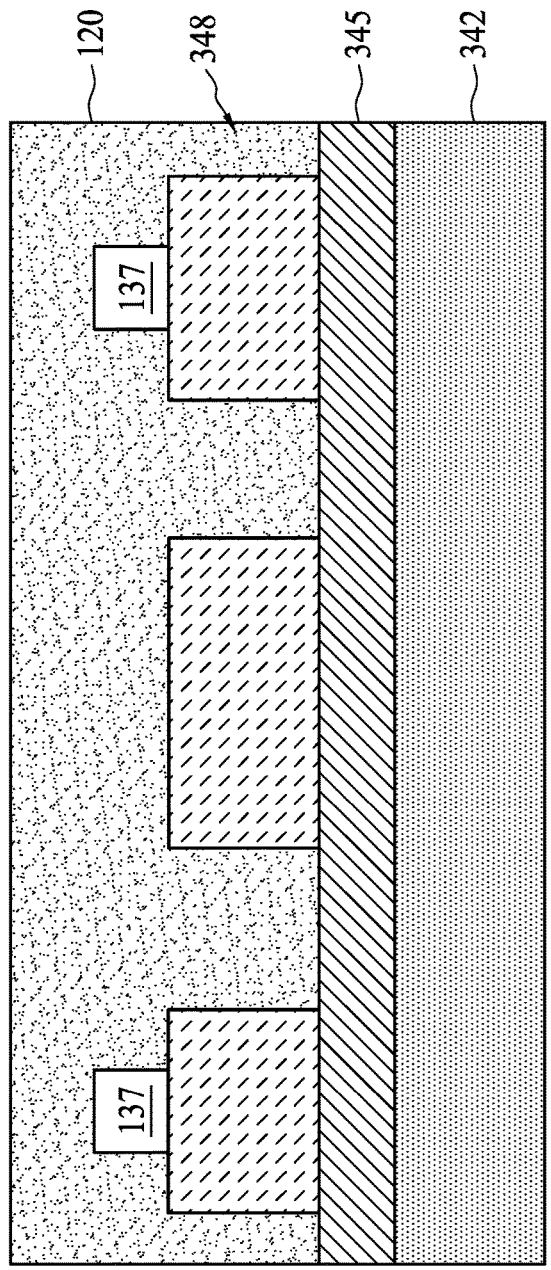
Figure 6G:
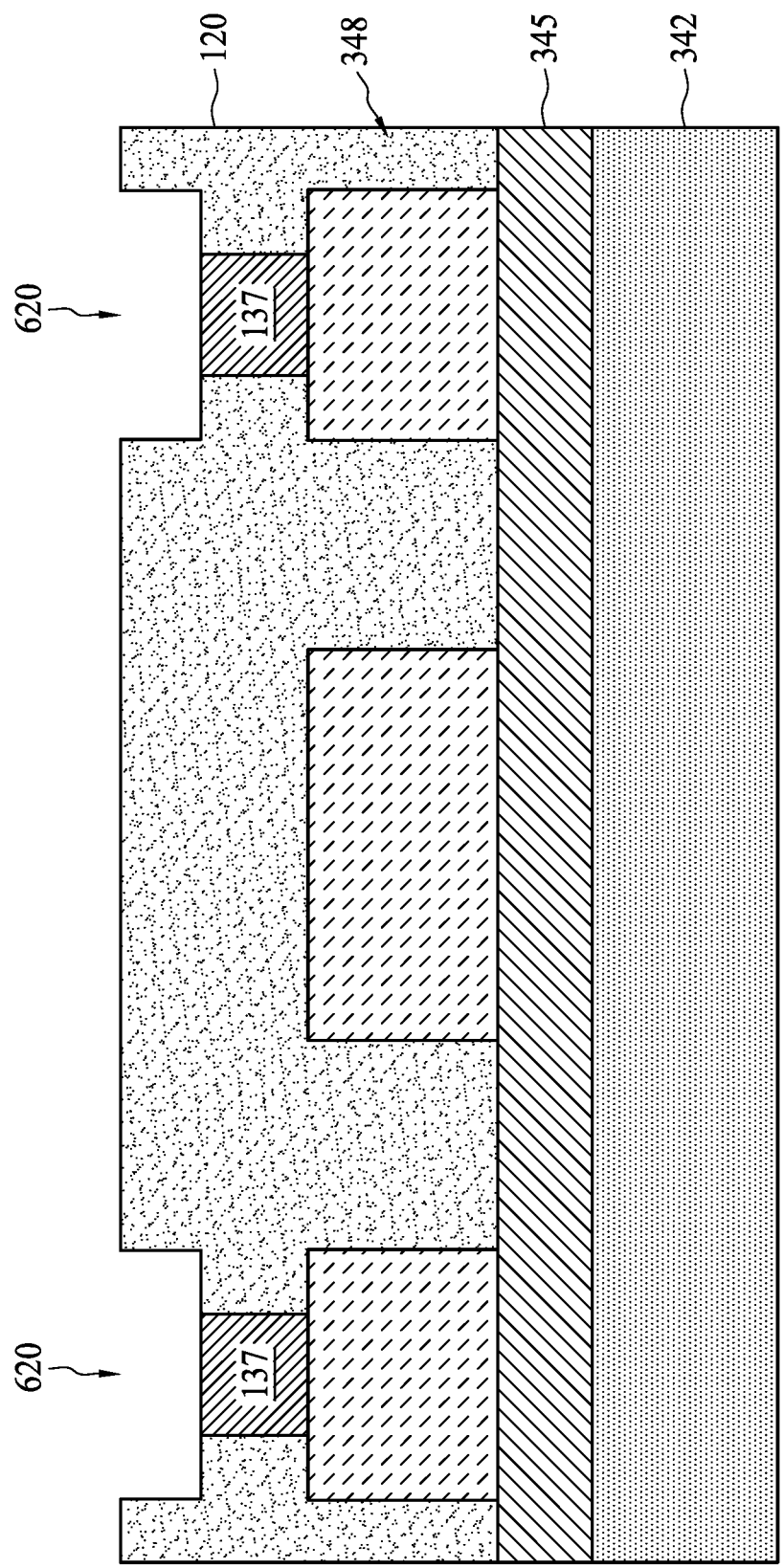

Next, referring to FIG. 6F, another dielectric layer (not numbered) is formed on the conductive vias 137 and the dielectric layer 110, resulting in a dielectric layer 120. In FIG. 6G, the dielectric layer 120 is patterned, exposing the conductive vias 137 through openings 620.

Figure 6H:
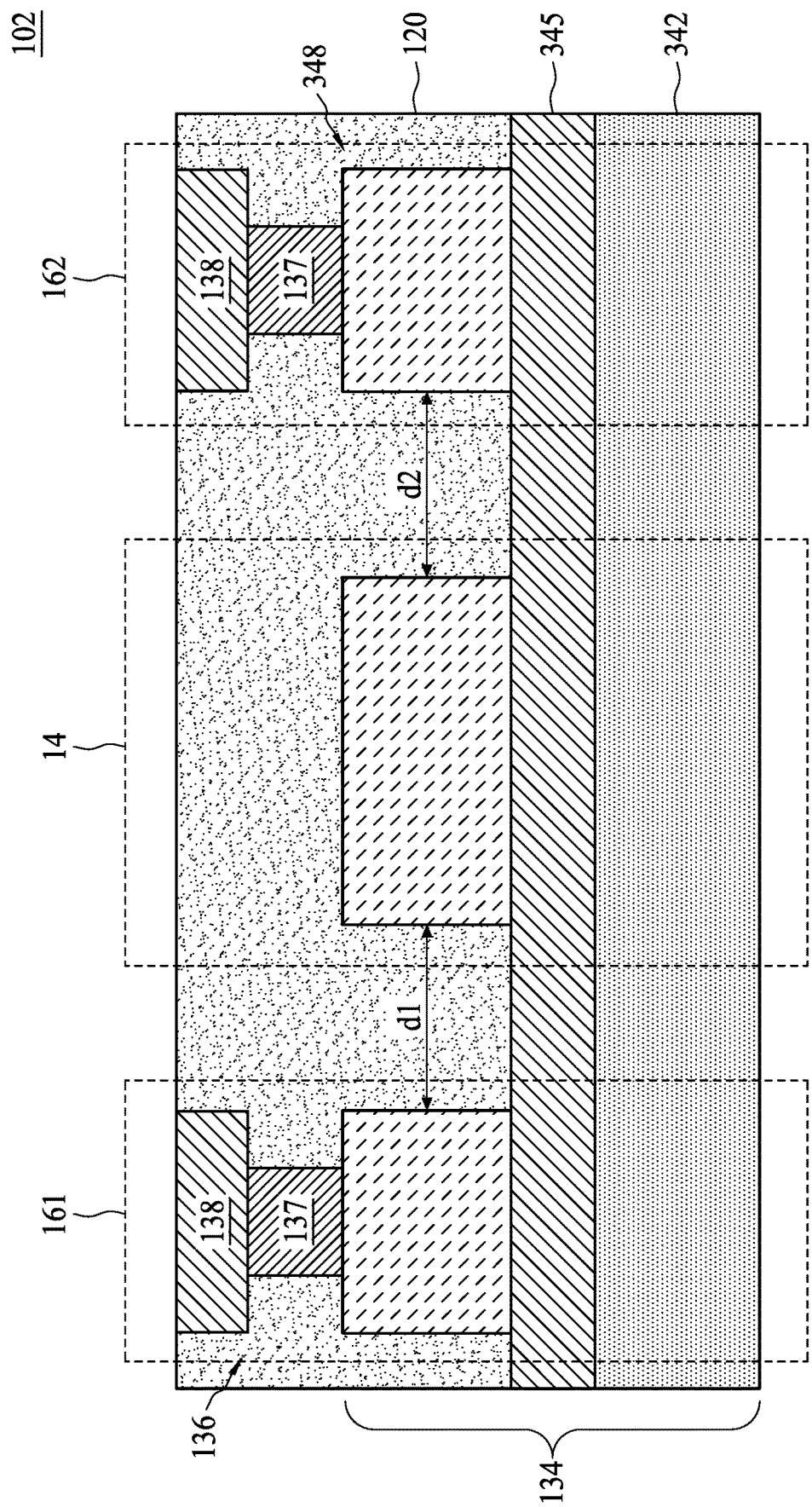

Subsequently, referring to FIG. 6H, a conductive layer 138 is formed on the conductive vias 137 by using, for example, a deposition process, resulting in a conductive structure 136 as illustrated in FIG. 1B. The conductive layer 138 may include copper. As a result, a first attenuator 161 and a second attenuator 162 are formed.

Figure 7A:
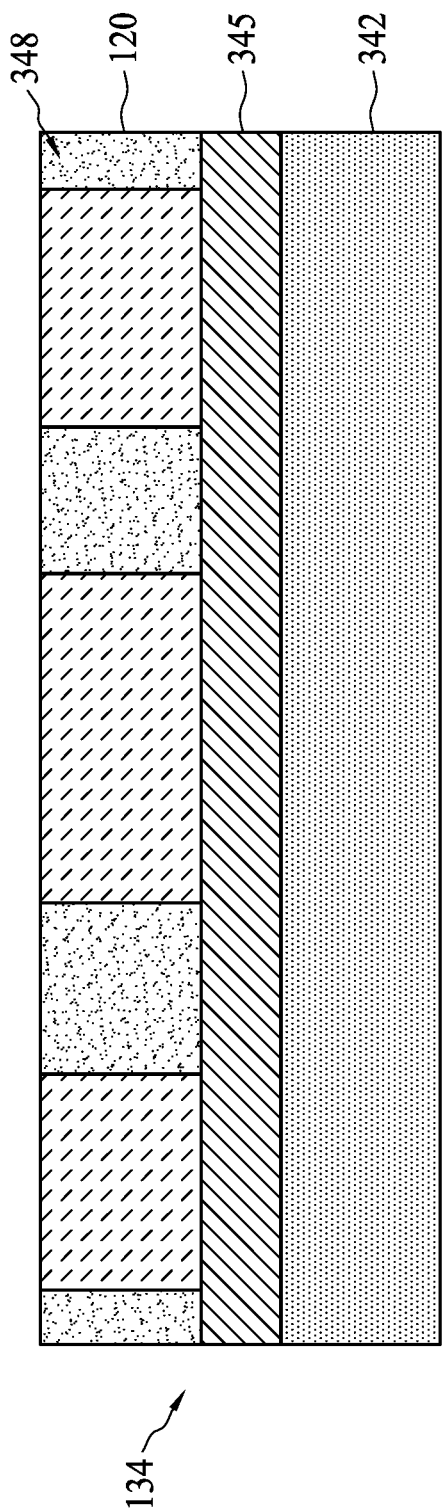
FIGS. 7A and 7B are cross-sectional views showing a method of forming the optical device illustrated in FIG. 2C, taken along a line YY, in accordance with some embodiments of the present disclosure.
Figure 7B:
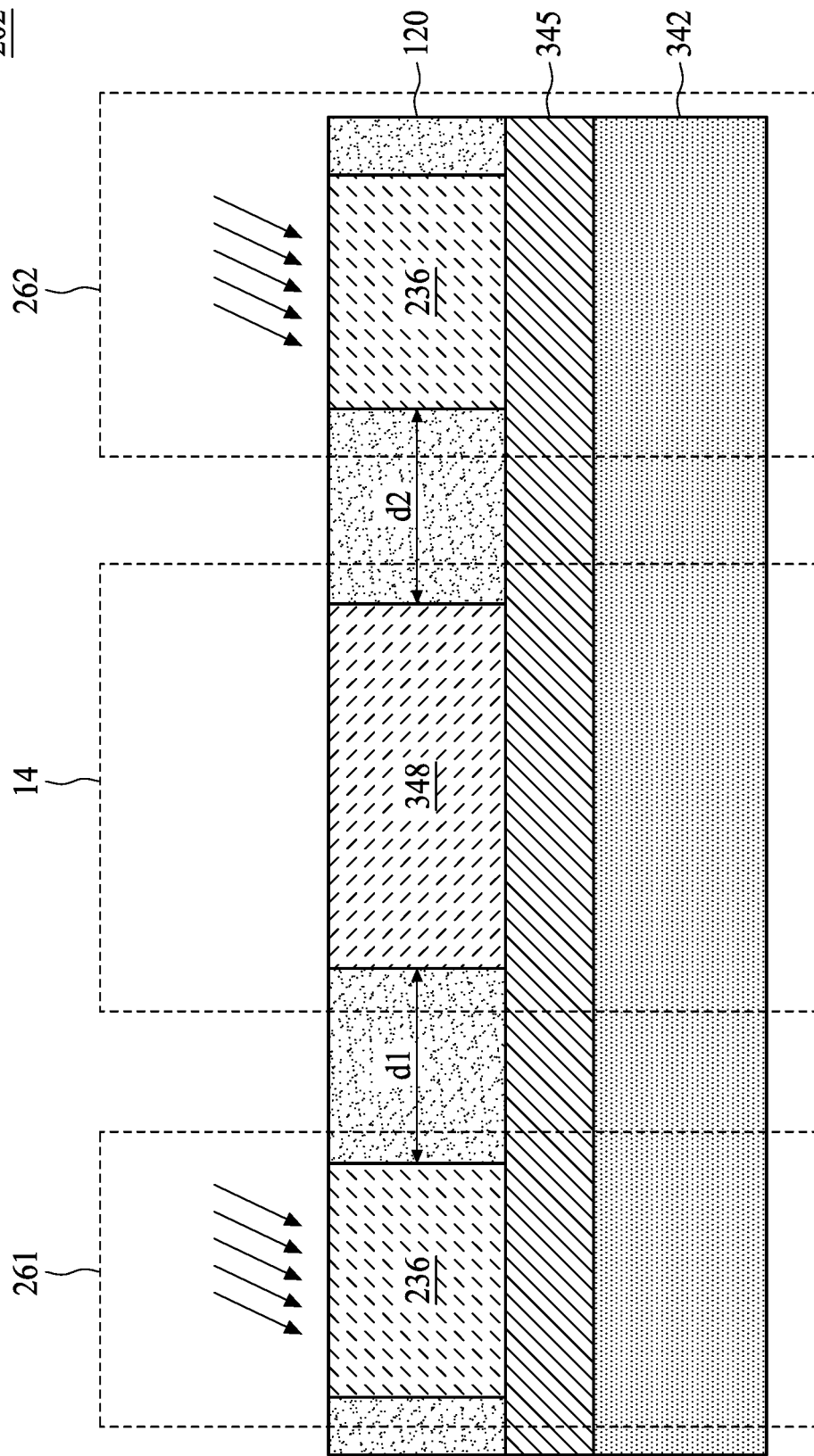

FIGS. 7A and 7B are cross-sectional views showing a method of forming the optical device 202 illustrated in FIG. 2C, taken along a line YY, in accordance with some embodiments of the present disclosure.

Referring to FIG. 7A, similar to the method described and illustrated with reference to FIGS. 6A to 6C, an SOI substrate 134 is provided. The second silicon layer 348 is patterned and then a dielectric layer 120 is formed on the BOX layer 345. The dielectric layer 120 exposes the pattered second silicon layer 348.

Referring to FIG. 7B, doped structures 236 are formed by, for example, a doping process. As a result, a first attenuator 261 and a second attenuator 262 are formed. In some embodiments, the concentration of a dopant for the doping process may range from approximately $10^{19}$ to $10^{20}$ cm$^{-3}$. In an embodiment, the tapper 14 may also be doped with the dopant in the doping process, resulting in a doped taper 24 as described and illustrated in FIG. 3C. In another embodiment, the optical device, such as the optical device 301 described and illustrated with reference to FIG. 3A, is free of attenuators and includes a doped structure for degrading unwanted signal.

Figure 8:
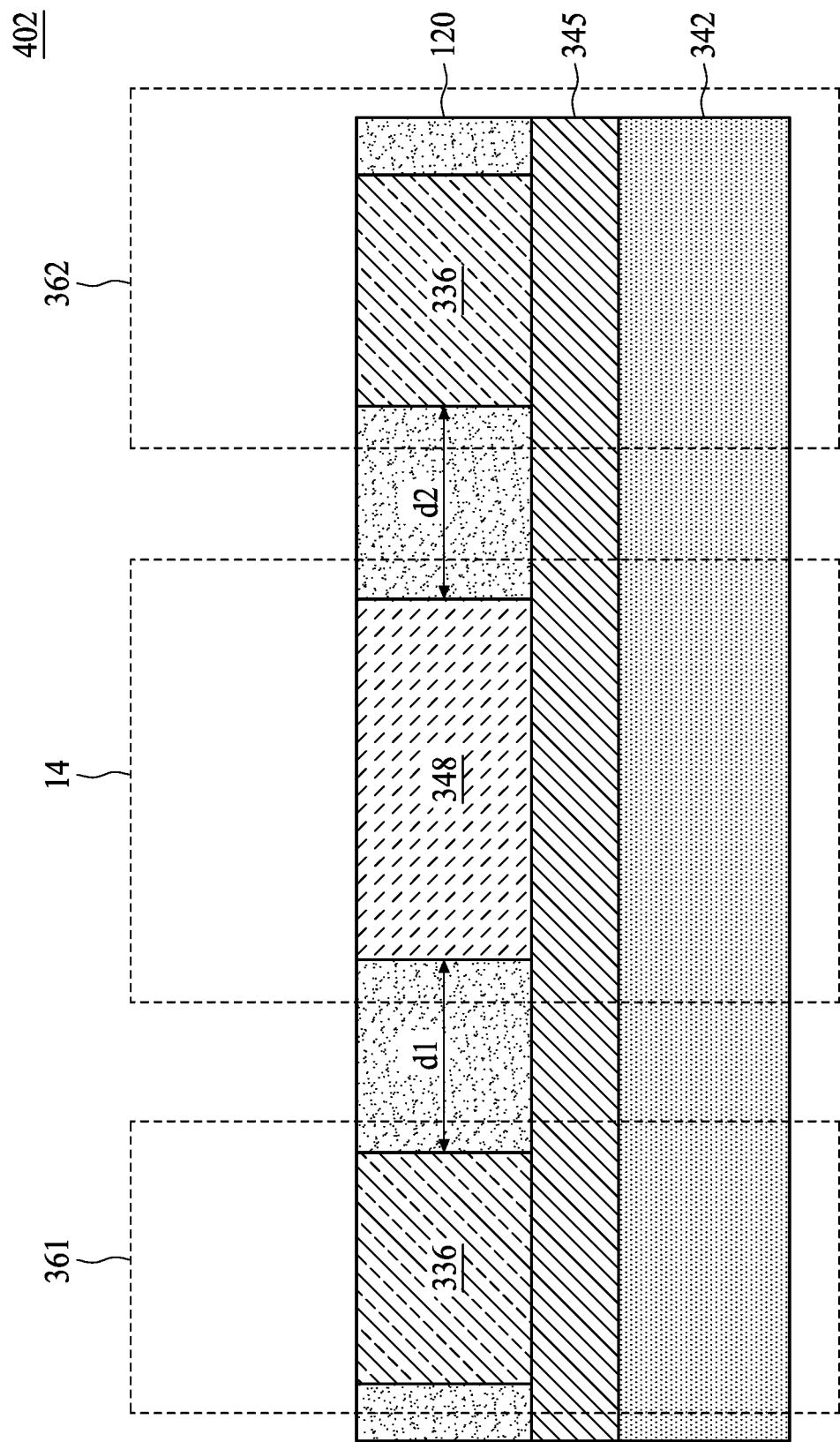
FIG. 8 is a cross-sectional view showing a method of forming the optical device illustrated in FIG. 4C, taken along a line ZZ, in accordance with some embodiments of the present disclosure.

FIG. 8 is a cross-sectional view showing a method of forming the optical device 402 illustrated in FIG. 4C, taken along a line ZZ, in accordance with some embodiments of the present disclosure.

Referring to FIG. 8, similar to the method described and illustrated with reference to FIGS. 6A to 6C, an SOI substrate 134 is provided. The second silicon layer 348 is patterned and then a dielectric layer 120 is formed on the BOX layer 345. The dielectric layer 120 exposes the pattered second silicon layer 348. Subsequently, refraction structures 336 are formed by, for example, an implanting process. As a result, a first attenuator 361 and a second attenuator 362 are formed. In an embodiment, the tapper 14 may also be implanted with nitride in the implanting process, resulting in a refractive taper 34 as described and illustrated in FIG. 5C. In another embodiment, the optical device, such as the optical device 501 described and illustrated with reference to FIG. 5A, is free of attenuators and includes a refractive structure for degrading unwanted signal.

Embodiments of the present disclosure provide an optical device. The optical device includes a waveguide configured to guide light, a taper integrated with the waveguide on a substrate and configured for optical coupling, and a first attenuator extending along a first side of the taper. The first attenuator includes a conductive structure on the substrate. The conductive structure includes conductive vias on the substrate; and a metal layer, on the conductive vias, extending along the first side of the taper.

Embodiments of the present disclosure also provide an optical device. The optical device includes a waveguide configured to guide light, a taper integrated with the waveguide on a substrate and configured for optical coupling, and a first attenuator extending along a first side of the taper. The first attenuator includes a doped structure in the substrate to facilitate degrading unwanted optical signal from the taper.

Some embodiments of the present disclosure provide an optical device. The optical device includes a waveguide configured to guide light, a taper integrated with the waveguide on a substrate and configured for optical coupling, and a first attenuator extending along a first side of the taper. The first attenuator includes a refractive structure in the substrate to facilitate degrading unwanted optical signal from the taper. The refractive structure has an index of refraction larger than that of the substrate.

Some embodiments of the present disclosure provide an optical device. The optical device includes a waveguide disposed on an oxide layer and configured to guide light; a taper disposed on the oxide layer, integrated with the waveguide, and configured for optical coupling; and a first attenuator extending along a first side of the taper, including a doped structure spaced apart from the taper and configured to facilitate degrading unwanted optical signal from the taper.

Some embodiments of the present disclosure provide an optical device. The optical device includes a waveguide disposed on an oxide layer and configured to guide light; a taper disposed on the oxide layer, integrated with the waveguide, and configured for optical coupling; and a first attenuator extending along a first side of the taper, including a refractive structure configured to facilitate degrading unwanted optical signal from the taper, and having an index of refraction larger than that of the oxide layer.

Some embodiments of the present disclosure provide an optical device. The optical device includes a waveguide disposed on an oxide layer and configured to guide light; a doped taper integrated with the waveguide, and configured for optical coupling and facilitating alleviation of unwanted optical signal radiated therefrom; and a first attenuator extending along a first side of the taper, including a first doped structure configured to facilitate degrading unwanted optical signal from the doped taper.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical device, comprising:
a waveguide disposed on an oxide layer and configured to guide light;
a taper disposed on the oxide layer, connected to the waveguide, and configured for optical coupling;
a first attenuator extending along a first side of the taper, including a doped structure spaced apart from the taper and configured to facilitate degrading unwanted optical signal from the taper;
a dielectric layer disposed over the oxide layer and surrounding the waveguide, the taper and the first attenuator,
wherein the first attenuator is entirely enclosed by the oxide layer and the dielectric layer to physically separate from the waveguide and the taper.

2. The optical device of claim 1, wherein the doped structure includes a silicon layer doped with impurity.

3. The optical device of claim 1, wherein the first attenuator extends along a portion of the first side of the taper.

4. The optical device of claim 3, further comprising a second attenuator separated from the first attenuator and extending along the first side of the taper.

5. The optical device of claim 1, further comprising a second attenuator extending along a second side of the taper, the second side being opposite to the first side.

6. The optical device of claim 5, wherein the second attenuator extends along a portion of the second side of the taper.

7. The optical device of claim 1, wherein the taper is entirely enclosed by the dielectric layer, the oxide layer and the waveguide to physically separate from the first attenuator.

8. The optical device of claim 1, wherein the taper includes a silicon layer doped with impurity.

9. An optical device, comprising:
a waveguide disposed on an oxide layer and configured to guide light;
a taper disposed on the oxide layer, connected to the waveguide, and configured for optical coupling; and
a first attenuator extending along a first side of the taper, including a refractive structure configured to facilitate degrading unwanted optical signal from the taper, and having an index of refraction larger than that of the oxide layer,
wherein the first attenuator is entirely and physically separated from the taper by a dielectric layer disposed between the first attenuator and the taper.

10. The optical device of claim 9, wherein the refractive structure includes a silicon nitride layer.

11. The optical device of claim 9, wherein the first attenuator extends along a portion of the first side of the taper, further comprising a second attenuator separated from the first attenuator and extending along the first side of the taper.

12. The optical device of claim 9, further comprising a second attenuator extending along a second side of the taper, the second side being opposite to the first side.

13. The optical device of claim 12, wherein the second attenuator extends along a portion of the second side of the taper, further comprising a third attenuator separated from the second attenuator and extending along the second side of the taper.

14. The optical device of claim 9, wherein the taper includes a silicon layer doped with nitride.

15. An optical device, comprising:
a waveguide disposed on an oxide layer and configured to guide light;
a doped taper connected to the waveguide, and configured for optical coupling and facilitating alleviation of unwanted optical signal radiated therefrom; and
a first attenuator extending along a first side of the doped taper, including a first doped structure configured to facilitate degrading unwanted optical signal from the doped taper,
wherein the first attenuator is entirely and physically isolated from the doped taper by a dielectric layer disposed between the first attenuator and the doped taper.

16. The optical device of claim 15, wherein the doped taper includes a silicon layer doped with impurity.

17. The optical device of claim 15, wherein the first attenuator extends along a portion of the first side of the doped taper.

18. The optical device of claim 17, further comprising a second attenuator including a second doped structure, separated from the first attenuator and extending along the first side of the doped taper.

19. The optical device of claim 15, further comprising a second attenuator including a second doped structure and extending along a second side of the doped taper, wherein the second side is opposite to the first side.

20. The optical device of claim 19, wherein the second attenuator extends along a portion of the second side of the doped taper.

* * * * *